United States Patent
Lee et al.

(10) Patent No.: US 11,868,680 B2
(45) Date of Patent: *Jan. 9, 2024

(54) ELECTRONIC DEVICE AND METHOD FOR GENERATING SHORT CUT OF QUICK COMMAND

(71) Applicant: Samsung Electronics Co., Ltd., Gyeonggi-do (KR)

(72) Inventors: Yoonju Lee, Gyeonggi-do (KR); Jeongpyo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,012

(22) Filed: Oct. 22, 2021

(65) Prior Publication Data

US 2022/0043628 A1 Feb. 10, 2022

Related U.S. Application Data

(63) Continuation of application No. 16/550,447, filed on Aug. 26, 2019, now Pat. No. 11,188,298.

(30) Foreign Application Priority Data

Aug. 30, 2018 (KR) .......................... 10-2018-0102610

(51) Int. Cl.
*G06F 3/16* (2006.01)
*G06F 3/0482* (2013.01)
(Continued)

(52) U.S. Cl.
CPC ............ *G06F 3/167* (2013.01); *G06F 3/0482* (2013.01); *G06F 3/04817* (2013.01);
(Continued)

(58) Field of Classification Search
CPC .... G06F 3/167; G06F 3/04817; G06F 3/0482; G06F 9/4843; G10L 15/22; G10L 2015/223
See application file for complete search history.

(56) References Cited

U.S. PATENT DOCUMENTS 8,453,058 B1 5/2013 Coccaro et al.
8,615,228 B2 12/2013 Joh et al.
(Continued)

FOREIGN PATENT DOCUMENTS

EP 2 474 973 A1 7/2012
EP 3 367 225 A1 8/2018
(Continued)

OTHER PUBLICATIONS

Ennals et al.; "MashMaker: Mashups for the Masses"; Beijing, China; Jun. 12-14, 2007; XP058380149, 3 pages.
(Continued)

*Primary Examiner* — Kavita Stanley
*Assistant Examiner* — William Wong
(74) *Attorney, Agent, or Firm* — Cha & Reiter, LLC

(57) ABSTRACT

An electronic device and method are disclosed. The electronic device includes a display, a microphone, a communication circuit, a processor, and a memory. The memory stores instructions that, when executed by the processor, implement the method. The method includes determining whether the electronic device is communicatively coupled to an external display device, when the electronic device is not communicatively coupled to the external display, receiving a first user utterance, executing a task corresponding to at least one of a word, phrase or sentence included in the first user utterance as indicated by the mapping, the task preconfigured by a user, and when the electronic device is communicatively coupled to the external display device, dis-
(Continued)

playing at least one of a text and a graphical user interface (GUI) indicating the at least one word, phrase, and sentence on the external display.

20 Claims, 19 Drawing Sheets

(51) Int. Cl.
    *G06F 3/04817* (2022.01)
    *G10L 15/22* (2006.01)
    *G06F 9/48* (2006.01)

(52) U.S. Cl.
    CPC ............ *G06F 9/4843* (2013.01); *G10L 15/22* (2013.01); *G10L 2015/223* (2013.01)

(56) References Cited

U.S. PATENT DOCUMENTS

| | | |
|---|---|---|
| 8,650,036 B2 | 2/2014 | Han et al. |
| 9,082,407 B1 | 7/2015 | Faaborg et al. |
| 9,148,688 B2 | 9/2015 | Han et al. |
| 9,437,127 B2 | 9/2016 | Park et al. |
| 9,460,717 B2 | 10/2016 | Kim et al. |
| 10,051,103 B1 | 8/2018 | Gordon et al. |
| 10,120,645 B2 | 11/2018 | Kim et al. |
| 10,171,865 B2 | 1/2019 | Minemura |
| 10,250,935 B2 | 4/2019 | Park et al. |
| 10,304,465 B2 | 5/2019 | Gunn et al. |
| 11,086,596 B2 | 8/2021 | Kim et al. |
| 11,295,275 B2 * | 4/2022 | Choi ................... G06F 3/0482 |
| 2004/0039862 A1 | 2/2004 | Hunt et al. |
| 2004/0176958 A1 | 9/2004 | Salmenkaita et al. |
| 2005/0179540 A1 | 8/2005 | Rubenstein |
| 2011/0151899 A1 | 6/2011 | Sanchez |
| 2011/0191611 A1 | 8/2011 | boni ang gaw go et al. |
| 2012/0052909 A1 | 3/2012 | Joh et al. |
| 2012/0176313 A1 | 7/2012 | Ryu et al. |
| 2012/0245945 A1 | 9/2012 | Miyauchi et al. |
| 2013/0085755 A1 | 4/2013 | Bringert et al. |
| 2013/0090930 A1 | 4/2013 | Monson et al. |
| 2013/0141331 A1 | 6/2013 | Shiu et al. |
| 2013/0148720 A1 | 6/2013 | Rabii |
| 2013/0150098 A1 | 6/2013 | Sanchez |
| 2013/0169697 A1 | 7/2013 | Park et al. |
| 2013/0173270 A1 | 7/2013 | Han et al. |
| 2013/0218572 A1 | 8/2013 | Cho et al. |
| 2014/0063066 A1 | 3/2014 | Choi |
| 2014/0075377 A1 * | 3/2014 | Kang ................ H04M 1/72409 715/788 |
| 2014/0078079 A1 * | 3/2014 | Wang ................... H04L 63/083 345/173 |
| 2014/0092007 A1 | 4/2014 | Kim et al. |
| 2014/0129234 A1 | 5/2014 | Han et al. |
| 2014/0142953 A1 | 5/2014 | Kim et al. |
| 2014/0196087 A1 | 7/2014 | Park et al. |
| 2014/0223477 A1 | 8/2014 | Han et al. |
| 2014/0244269 A1 | 8/2014 | Tokutake |
| 2014/0278443 A1 | 9/2014 | Gunn et al. |
| 2014/0318874 A1 | 10/2014 | Moses et al. |
| 2015/0189356 A1 | 7/2015 | Shen |
| 2016/0117793 A1 | 4/2016 | Sierra et al. |
| 2016/0150177 A1 | 5/2016 | Minemura |
| 2016/0240189 A1 | 8/2016 | Lee et al. |
| 2017/0018275 A1 | 1/2017 | Gunn et al. |
| 2017/0076724 A1 * | 3/2017 | Park ....................... G06F 16/00 |
| 2017/0168670 A1 | 6/2017 | Sovalin et al. |
| 2017/0213569 A1 * | 7/2017 | Jang ...................... G06F 3/0488 |
| 2018/0108359 A9 | 4/2018 | Gunn et al. |
| 2018/0173403 A1 | 6/2018 | Carbune et al. |
| 2018/0246634 A1 | 8/2018 | Suh et al. |
| 2018/0301150 A1 * | 10/2018 | Woo ..................... G06F 3/04842 |
| 2020/0192564 A1 | 6/2020 | Zhu et al. |
| 2020/0213438 A1 | 7/2020 | Liu et al. |

FOREIGN PATENT DOCUMENTS

| | | |
|---|---|---|
| KR | 10-2012-0020853 A | 3/2012 |
| KR | 10-1324232 B1 | 7/2013 |
| KR | 10-2014-0042641 A | 4/2014 |
| KR | 10-2017-0054367 A | 5/2017 |

OTHER PUBLICATIONS

European Office Action dated Jan. 12, 2023, 14 pages.
Korean Office Action dated Feb. 17, 2023, 12 pages.

* cited by examiner

ELECTRONIC DEVICE AND METHOD FOR GENERATING SHORT CUT OF QUICK COMMAND

CROSS-REFERENCE TO RELATED APPLICATION(S)

This application is a Continuation of Ser. No. 16/550,447 filed on Aug. 26, 2019 based on and claims priority under 35 U.S.C. § 119 to Korean Patent Application No. 10-2018-0102610, filed on Aug. 30, 2018, in the Korean Intellectual Property Office, the disclosure of which is incorporated by reference herein its entirety.

BACKGROUND

1. Field

The disclosure relates to computer processes for enabling human interaction with smart devices, and, more particularly, to the generation of "quick commands" in the context of voice-assisted user inputs.

2. Description of Related Art

An electronic device may provide a service corresponding to the content of a voice input based on the voice input of a user. For example, when an electronic device receives a voice input of "let me know today's weather?", the electronic device may perform a task previously mapped to the received voice input "let me know today's weather?", such as for example, a first operation of executing a web browser, and a second operation of navigating to a web page that provides weather information in the executed web browser.

The above information is presented as background information only to assist with an understanding of the disclosure. No determination has been made, and no assertion is made, as to whether any of the above might be applicable as prior art with regard to the disclosure.

SUMMARY

An electronic device may perform at least one task, which has been performed based on the user's multiple touch inputs, based on a single voice input, thereby providing the convenience of a user's manipulation. However, because the user feels uncomfortable with the voice input to make a request for the execution of a task in the environment (quiet environment or public place) where it is difficult for the user to perform an utterance, the user may not employ the service based on the voice input. Furthermore, as the bottom end of the electronic device is inserted into a relay device in a desktop extended (DEX) mode in which the electronic device is connected to an external display device, the electronic device may be connected to the external display device. In this case, the sensitivity of the microphone disposed at the bottom end of the electronic device may be degraded, and thus the electronic device may fail to accurately recognize the user's voice input.

Aspects of the disclosure are to address at least the above-mentioned problems and/or disadvantages and to provide at least the advantages described below. Accordingly, an aspect of the disclosure is to provide an electronic device capable of generating a short cut icon, which allows at least one task (each task includes a plurality of actions) mapped to a voice input to be performed based on a user's manipulation (e.g., touch), and a method of generating a short cut of a quick command.

In accordance with an aspect of the disclosure, an electronic device may include a display, a microphone, a communication circuit, a processor operatively connected to the display, the microphone, and the communication circuit, and a memory operatively connected to the processor. The memory may store instructions that, when executed, cause the processor to: access a database in which words, phrases and/or sentences are mapped to a plurality of tasks, receive a first user utterance through the microphone when the electronic device is not communicatively coupled to an external display device, execute a task corresponding to at least one of a word, phrase or sentence included in the first user utterance as indicated by the mapping of the database, wherein the task is preconfigured by a user, and after receiving the first user utterance, when the electronic device is communicatively coupled to the external display device, display, on the external display device, at least one of a text and a graphic user interface (GUI) indicating the at least one of the word, phrase or sentence included in the first user utterance and corresponding with the executed task.

In accordance with another aspect of the disclosure, a method in an electronic device is disclosed, including: accessing a database in which words, phrases and/or sentences are mapped to a plurality of tasks, determining whether the electronic device is communicatively coupled to an external display device, when the electronic device is not communicatively coupled to the external display device, receiving a first user utterance through a microphone, executing a task corresponding to at least one of a word, phrase or sentence included in the first user utterance as indicated by the mapping in the database, the task preconfigured by a user, and when the electronic device is communicatively coupled to the external display device, displaying at least one of a text and a graphical user interface (GUI) indicating the at least one word, phrase, and sentence on the external display device.

In accordance with another aspect of the disclosure, an electronic device may include a display, a microphone, a communication circuit, a processor operatively connected to the display, the microphone, and the communication circuit, and a memory operatively connected to the processor. The memory may store instructions that, when executed, cause the processor to access a database in which words, phrases and/or sentences are mapped to a plurality of tasks, receive a first user utterance through the microphone, execute a task corresponding to at least one of a word, phrase or sentence included in the first user utterance as indicated by the mapping of the database, wherein the task is preconfigured by a user, and display a text and/or a GUI indicating the at least one of the word, phrase, or sentence on the display, based on settings for the word, phrase, or sentence.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
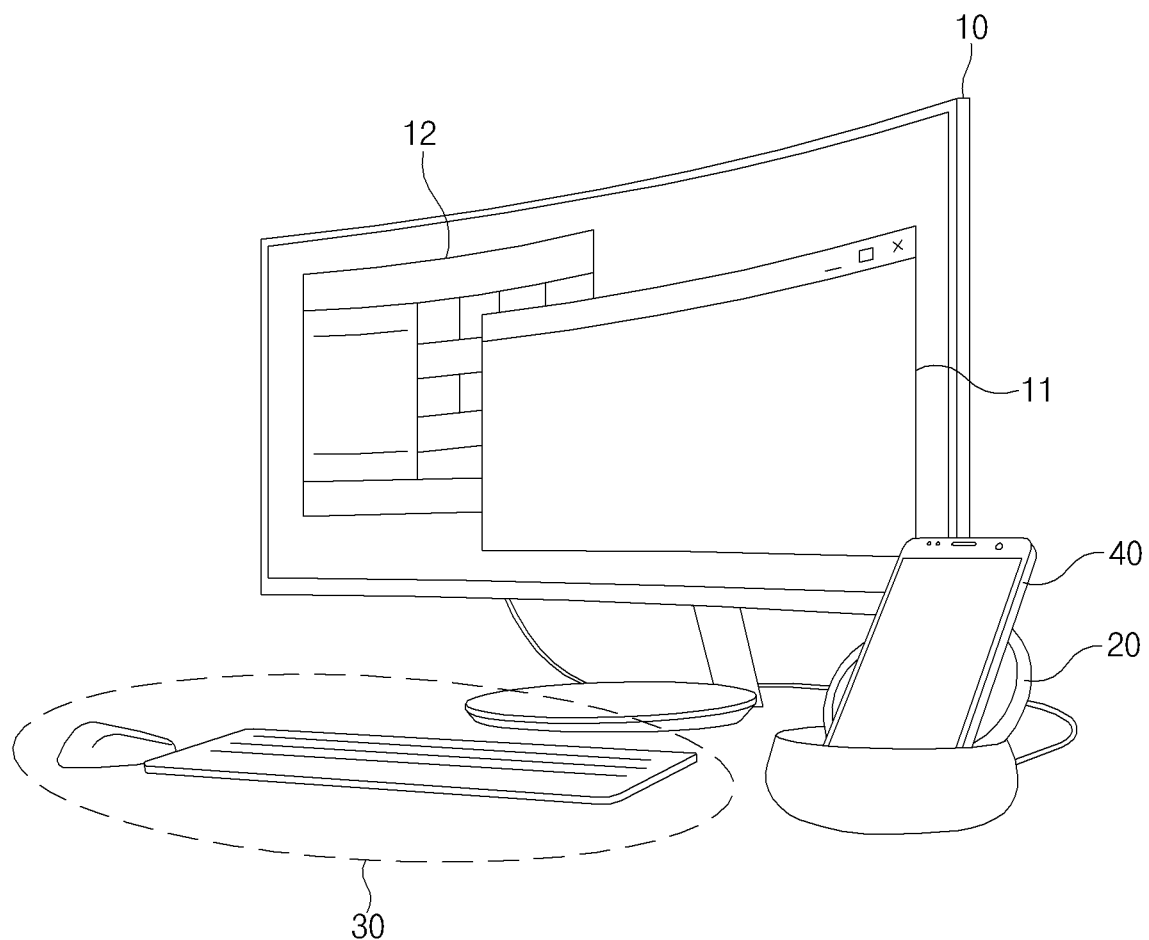
FIG. 1 is an example view of an operating environment of an electronic device, according to an embodiment.
Figure 2:
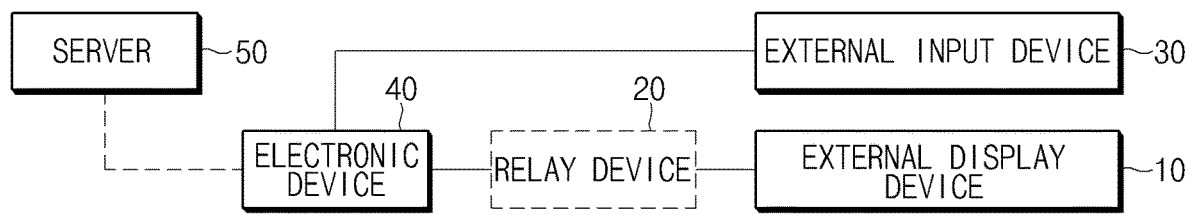
FIG. 2 is a block diagram of an operating environment of an electronic device, according to an embodiment.

FIG. 1 is an example view of an operating environment of an electronic device, according to an embodiment. FIG. 2 is a block diagram of an operating environment of an electronic device, according to an embodiment.

Referring to FIG. 1 and FIG. 2, According to an embodiment, the electronic device 40 may be connected to the external display device 10 and an external input device 30. The electronic device 40 may be connected to the external display device 10 through a relay device 20.

According to an embodiment, for example, the external display device 10 may be a device including a display such as a monitor or a TV. The external display device 10 may output the screen received from the electronic device 40.

According to an embodiment, the external input device 30 may be a device receiving a user input, such as a mouse, a keyboard, or a touch pad. The external input device 30 may be connected to the electronic device 40 or the relay device 20 through an interface such as BLUETOOTH™ or USB. When receiving a user input, the external input device 30 may transmit the received user input to the electronic device 40. According to certain embodiments, the external input device 30 may be connected to the electronic device 40 through the external display device 10.

According to an embodiment, the relay device 20 may include a dock (or a docking station). The relay device 20 may be connected to the electronic device 40 through an interface, such as USB, HDMI, D-SUB, or an optical interface. According to certain embodiments, when the electronic device 40 is capable of wireless or wired communication with the external display device 10, the relay device 20 may be omitted.

According to an embodiment, when the electronic device 40 is connected to the external display device 10, the electronic device 40 may display the screen on the external display device 10. For example, the electronic device 40 may display a screen, which is the same as the screen displayed on the electronic device 40, on the external display device 10 (e.g., a mirroring mode). Alternatively, the electronic device 40 may output the screen displayed on the electronic device 40, as the partial image of the external display device 10 or may change the partial image so as to be matched to the external display device 10 and then may output the changed image (e.g., a desktop extended (DEX) mode). For example, the electronic device 40 may display images corresponding to a plurality of applications in a running state or the whole image of a specific application, which displays the partial image on the electronic device 40, on the external display device 10.

According to an embodiment, when the electronic device 40 is connected to the external display device 10 in the DEX mode, the electronic device 40 may $_{[RH1]}$recreate the home screen of the electronic device 40 to correspond to the external display device 10 and may display the recreated home screen to the external display device 10. For example, the recreated home screen may be a UI screen similar to the home screen of a desktop computer. The recreated home screen may include a short cut (e.g., a short cut icon) of each of the applications installed in the electronic device 40.

According to an embodiment, in the DEX mode, the electronic device 40 may display the execution screen of the application on the external display device 10 or the electronic device 40. For example, when the application requested to be executed in the DEX mode belongs to a whitelist, the electronic device 40 may recreate (e.g., change the resolution, density, or orientation) the execution screen of the application as the window of the first type and may output the window of the first type to the external display device 10. The window of the first type may be the window recreated to correspond to the external display device 10 and may be a resizable window. For another example, when the application requested to be executed in the DEX mode belongs to a blacklist, the electronic device 40 may display the execution screen of an application, on the display of the electronic device 40. For another example, when the application requested to be executed in the DEX mode does not belong to both the whitelist and the blacklist, the electronic device 40 may output the window of the second type including the execution screen of an application, to the external display device 10. The window of the second type may be the window of the fixed size corresponding to the display size of the electronic device 40.

To the end, a server 50 may transmit the whitelist and blacklist to the electronic device 40, for example, periodically, upon update, or at the request of the electronic device 40. The whitelist may include a list of applications capable of resizing the window including the execution screen of an application. When the execution screen is output from the electronic device 40 to the external display device 10, the blacklist may include an application list in which an error of screen break occurs.

According to an embodiment, when receiving an input signal from the external input device 30, the electronic device 40 may perform processing corresponding to the input signal. For example, when the electronic device 40 is connected to the external input device 30, the electronic device 40 may display the cursor corresponding to the external input device 30, on the external display device 10. When the user places a cursor in a specific region of the screen displayed on the external display device 10 and then selects (e.g., double click) the specific region, the electronic device 40 may perform processing (e.g., executing the corresponding application when there is an icon associated with the application execution in the specific region or when there is a short cut icon) corresponding to the specific region.

Figure 3:
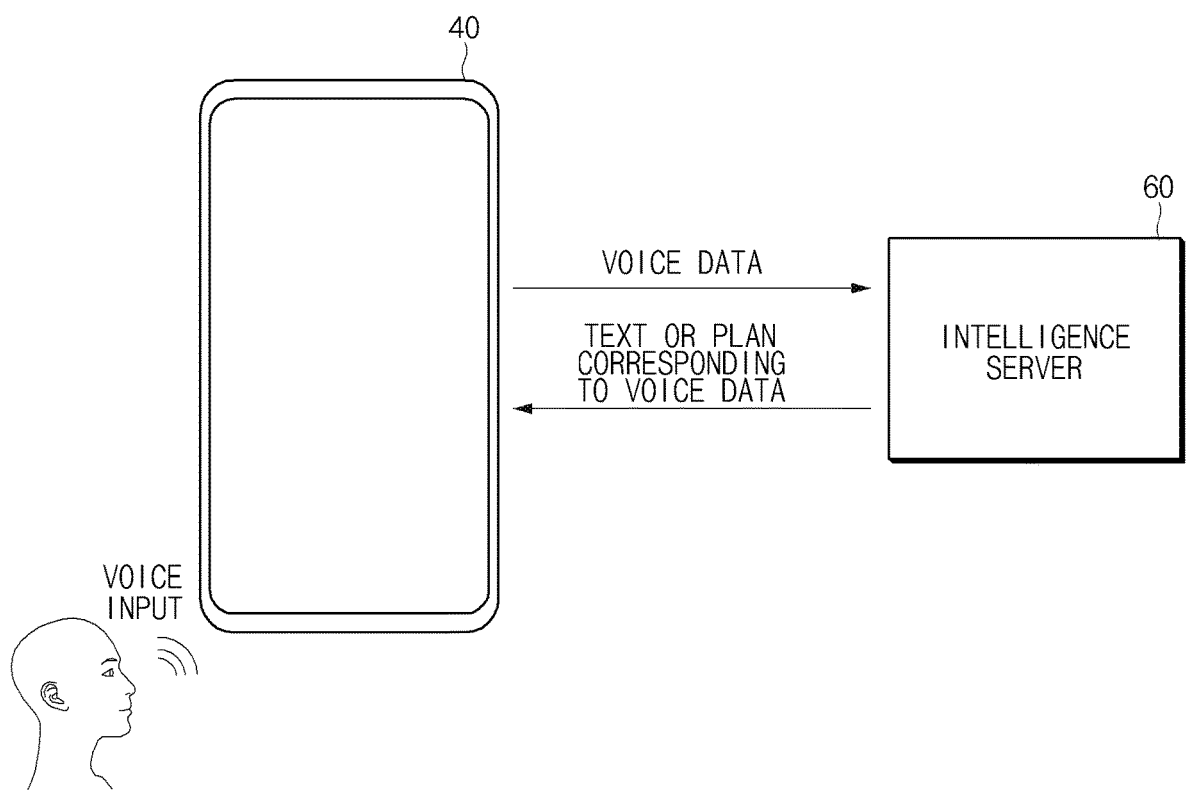
FIG. 3 is a view for describing a method of performing a task based on a voice input, according to an embodiment.

FIG. 3 is a view for describing a method of performing a task based on a voice input, according to an embodiment.

Referring to FIG. 3, according to an embodiment, the electronic device 40 may perform a task according to the intent of a user, based on the user's voice input. For example, the electronic device 40 may transmit voice data (pulse code modulation (PCM) data) corresponding to the received voice input, to an intelligence server 60. When receiving voice data, the intelligence server 60 may convert the voice data into text data and then may determine and transmit a plan for performing the task corresponding to the converted text data. The electronic device 40 may receive a plan corresponding to the voice input and may perform the task corresponding to the voice input based on the received plan. For example, the electronic device 40 may execute at least one app (application) based on the received plan and may perform the specified action of the executed at least one app. The plan may include a plurality of actions for performing the specified task corresponding to the voice input.

According to an embodiment, when the received voice input is a quick command, the electronic device 40 may perform at least one task corresponding to the quick command. Each task may include a plurality of actions. The quick command may be a command that allows a plurality of tasks corresponding to a plurality of voice inputs (or one voice input, the length of which is long) to be performed with one voice input (the length of which is short). The fact that the length is short may mean that the number of texts included in the voice input is small. For example, the electronic device 40 may identify text data corresponding to the received voice input; when one of the word, phrase, or sentence selected (or specified) by a user in the identified text data is included, the electronic device 40 may determine the received voice input as a quick command. According to certain embodiments, the selected word, phrase, or sentence may be stored to be mapped to task information corresponding to a plurality of voice inputs. For example, the task information may include at least one of pieces of text data or a plurality of plans corresponding to a plurality of voice inputs.

Figure 4:
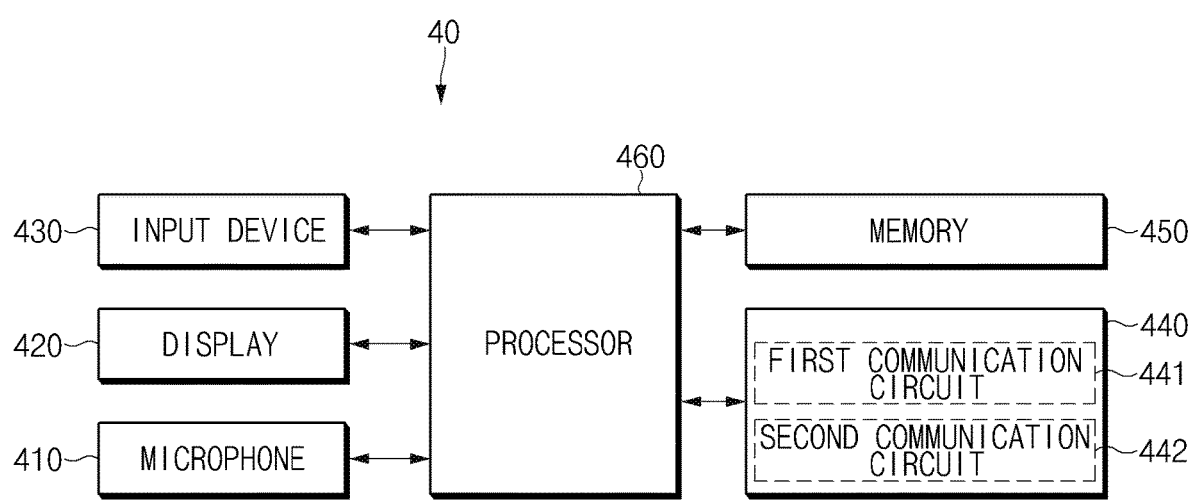
FIG. 4 illustrates a block diagram of an electronic device 40 (e.g., the electronic device 40 of FIG. 1), according to an embodiment.

FIG. 4 illustrates a block diagram of the electronic device 40 (e.g., the electronic device 40 of FIG. 1), according to an embodiment.

Referring to FIG. 4, the electronic device 40 may include a microphone 410, a display 420, an input device 430, a communication circuit 440, a memory 450, and a processor 460.

According to an embodiment, the microphone 410 may detect a voice input by a user utterance. For example, the microphone 410 may detect the user utterance and then may output a voice signal corresponding to the user utterance According to an embodiment, the display 420 may detect a touch input and may output a screen. The display 420 may display, for example, various kinds of content (e.g., a text, an image, a video, an icon, and/or a symbol). The display 420 may include, for example, a liquid crystal display (LCD), a light-emitting diode (LED) display, an organic LED (OLED) display, or an electronic paper display.

According to an embodiment, the input device 430 may detect or receive a user input. The input device 430 may include a touch sensor integrated with the display 420. An embodiment is exemplified as the input device 430 is a touch sensor integrated with the display 420.

According to an embodiment, the communication circuit 440 may include a first communication circuit 441 and a second communication circuit 442. The first communication circuit 441 may establish a first communication channel communicable with the intelligence server 60. For example, the first communication channel may include a communication channel for LTE or WI-FI™ ("Wi-Fi") communication. The second communication circuit 442 may establish a second communication channel communicable with the external display device 10. For example, the second communication channel may include a communication channel for communication of USB, HDMI, D-SUB or optical interface. For another example, the second communication channel may include a communication channel of a wireless communication scheme such as BLUETOOTH™.

For example, the memory 450 may store commands or data associated with at least one other component(s) of the electronic device 40. The memory 450 may be a volatile memory (e.g., a random access memory (RAM)), a non-volatile memory (e.g., a read only memory (ROM) or a flash memory), or a combination thereof. According to an embodiment, the memory 450 may store instructions that, when executed, cause the processor 460, in a first action at a point in time when the electronic device 40 is not connected to the external display device 10, to receive a first user utterance through the microphone 410, to perform a task, which is included in the first user utterance, which is mapped to the selected word, phrase, or sentence, and which is customized by a user, using at least part of the electronic device 40, and, in a second action at a point in time when the electronic device 40 is connected to the external display device 10 wiredly or wirelessly, using the communication circuit 440, to display a text and/or graphic user interface (GUI)—second short cut icon—indicating the selected word, phrase, or sentence, on the external display device 10. The memory 450 may store screen configuration information for implementing a screen corresponding to the display 420. For example, the screen configuration information may include the resolution information of the screen to be implemented, the density information of the screen to be implemented, and the orientation information (display orientation) of the screen to be implemented. The memory 450 may store information associated with each quick command, for example, the selected word, phrase, or sentence and task information (e.g., text data corresponding to a task ID or a quick command) mapped to the quick command.

The processor 460 may perform data processing or an operation associated with a control and/or a communication of at least one other component(s) of the electronic device 40 by using instructions stored in the memory 450. For example, the processor 460 may include at least one a central processing unit (CPU), a graphic processing unit (GPU), a microprocessor, an application processor (AP), and an application specific integrated circuit (ASIC), a field programmable gate arrays (FPGA) and may have a plurality of cores.

According to an embodiment, in a normal mode in which the electronic device 40 is disconnected from the external display device 10 through the second communication circuit 442, the processor 460 may execute a first launcher (a normal mode launcher). The processor 460 may implement a UI screen (e.g., a home screen or the execution screen of an application) corresponding to the display 420 through the first launcher and may output the implemented UI screen to the display 420. In this procedure, the first launcher may implement a screen corresponding to the display 420 using the screen configuration information corresponding to the display 420 stored in the memory 450.

According to an embodiment, the electronic device 40 may be connected to the external display device 10 via the second communication circuit 442. The electronic device 40 may be connected to the external display device 10 via a wired interface, such as a connector and a cable. Alternatively, the electronic device 40 may be connected to the external display device 10 via a wireless communication channel such as BLUETOOTH™. The electronic device 40 may be connected to the external display device 10 via the relay device 20.

According to an embodiment, in a DEX mode in which the electronic device 40 is connected to the external display device 10 through the second communication circuit 442, the processor 460 may execute a second launcher (a desktop mode launcher). The processor 460 may implement a UI screen corresponding to the external display device 10 through the second launcher and may output the implemented UI screen (e.g., a home screen or the execution screen of an application) to the external display device 10. When the processor 460 is connected to the external display device 10, the processor 460 may change the screen configuration information based on the specification of the external display device 10. Accordingly, the second launcher may implement the screen corresponding to the external display device 10, using the changed screen configuration information. For example, when the resolution of the external display device 10 is 1920×1080 (HD), the density is 160 DPI, and the orientation information is landscape, the processor 460 may determine the resolution information in the screen configuration information as 1920×1080 (HD), may determine the density information as 160 DPI, may change the orientation information as landscape, and may implement the screen to be output to the external display device 10, based on the changed screen configuration information.

According to an embodiment, the processor 460 may output the execution screen of an application to the external display device 10 or the display 420, based on the blacklist in the DEX mode. When the execution of the application is requested, the processor 460 may determine whether the target application requested to be executed belongs to the blacklist. When the target application does not belong to the blacklist, the processor 460 may output the execution screen of the target application to the external display device 10. On the other hand, when the target application belongs to the blacklist, the processor 460 may output the execution screen of the executed application to the display 420.

The processor 460 may implement the execution screen of the target application as the window of the first type or the window of the second type, based on the whitelist in the DEX mode. For example, when the target application belongs to the whitelist, the processor 460 may implement the execution screen of the target application as the resizable window of the second type. On the other hand, when the target application does not belong to the whitelist, the processor 460 may implement the execution screen of the target application as the window of the second type having the fixed size. According to certain embodiments, the processor 460 may implement the execution screen of the target application as the window of the first type or the window of the second type, based on information included in the manifest of the target application. The manifest of the application may include the declaration indicating whether the resize of the application is supported. Alternatively, the processor 460 may implement the execution screen of the target application as the window of the first type or the window of the second type, based on whether the target application is a preloaded application. When the target application is the preloaded application, the processor 460 may implement the execution screen of the target application as the window of the first type.

According to an embodiment, the processor 460 may receive the voice input according to a user utterance, using the microphone 410 and may perform the task corresponding to the received voice input. For example, the processor 460 may generate voice data corresponding to the voice input and may transmit the generated voice data to the intelligence server 60 through the second communication circuit 442. When receiving the plan corresponding to the voice data from the intelligence server 60 through the second communication circuit 442, the processor 460 may perform a specified task, for example, at least one application based on the received plan and may perform the specified action of the executed at least one application. According to certain embodiments, the processor 460 may perform the specified task corresponding to voice input by itself, without the collaboration with the intelligence server 60.

According to an embodiment, the processor 460 may distinguish the user's voice based on the voice input (e.g., a quick command); when the user's voice is different from the registered voice, the processor 460 may ignore the corresponding voice input and may not perform the task corresponding to the corresponding voice input.

According to an embodiment, the processor 460 may provide a quick command generation interface for performing at least one task (the task customized by the user) corresponding to a plurality of voice inputs (or a plurality of touch inputs), based on one (short) voice input. The quick command may be to perform a task, which is mapped to the selected word, phrase, or sentence and which is customized by the user. For example, when the generation of a quick command is requested, the processor 460 may receive a voice input associated with the word, phrase, or sentence to be set to a quick command and may provide an interface for setting a plurality of tasks (or at least one task) to be mapped to the quick command. The customized task may include a plurality of actions. The customized task may include a plurality of actions using a plurality of applications. The customized task may be specified by a user, may be generated based on the user's utterances, or may be provided from another electronic device (e.g., the intelligence server 60). For example, the task customized by the user may include the task mapped to the quick command selected by the user, in a list of quick commands provided (e.g., recommended) from another electronic device. For another example, the task customized by the user may include the task, which is selected by a user input, from among tasks corresponding to the previous user utterances or the current user utterance. According to certain embodiments, the quick command may be to perform at least one task requiring a plurality of touch inputs, based on one short voice input.

According to an embodiment, when the quick command (the selected word, phrase, or sentence) is generated, the processor 460 may map the generated quick command to task information to store the mapped result in the memory 450. For example, the task information may include a plurality of plans or pieces of text data (the text converted from pieces of voice data) corresponding to a plurality of voice inputs. In this disclosure below, an embodiment is exemplified as the quick command is mapped to the pieces of text data. For example, the quick command of 'home arrival' may be to indicate the execution of each of the first task for activating the WI-FI™ settings, the second task for activating BLUETOOTH™ settings, and the third task for playing music. In this case, the processor 460 may map pieces of text data of "turn on WI-FI™ in settings", "turn on BLUETOOTH™ in settings", "play music" respectively corresponding to a first voice input of "turn on WI-FI' in settings" indicating the execution of the first task, a second voice input of "turn on BLUETOOTH™ in settings" indicating the execution of the second task, and a third voice input of "play music" indicating the execution of the third task, to quick commands to store the mapped result.

According to an embodiment, for the purpose of determining whether a voice input corresponds to a quick command, the processor 460 may determine whether the text data corresponding to the voice input received through the microphone 410 corresponds to a quick command. For example, when the text data includes one of the selected (specified) word, phrase, or sentence, the processor 460 may determine that the voice input is a quick command. When the text data corresponds to a quick command, the processor 460 may perform a plurality of tasks corresponding to the quick command.

According to an embodiment, the processor 460 may generate the short cut icon of the quick command, with respect to a quick command, in which the generation of a short cut is requested, from among the generated quick commands. For example, when the generation of the quick command icon is requested, the processor 460 may determine the short cut icon of the quick command, may link the determined short cut icon to task information of the quick command, and may store short cut information of a quick command including the short cut icon and link information (e.g., link information between the short cut icon and the task information of a quick command). The short cut icon of the quick command may include the first short cut icon corresponding to the display 420 and the second short cut icon corresponding to the external display device 10.

According to an embodiment, when the generation of the first short cut icon of a quick command is requested, the processor 460 may generate the first short cut icon of a quick command, may link the first short cut icon to task information of a quick command, and may store the first short cut information of a quick command including the first short cut icon and link information between the task information of a quick command and the first short cut icon. The processor 460 may output the first short cut icon on the display 420, based on the first short cut information of a quick command in a normal mode.

According to an embodiment, when the generation of the second short cut icon of a quick command is requested, the processor 460 may generate the second short cut icon of a quick command, may link the second short cut icon to task information of a quick command, and may store the second short cut information of a quick command including the second short cut icon and link information between the task information of a quick command and the second short cut icon. The processor 460 may output the second short cut icon on the external display device 10, based on the second short cut information in the DEX mode. The second short cut icon may be implemented as a form (e.g., another image) different from the first short cut icon. According to certain embodiments, the processor 460 may generate the second short cut information at a point in time when the generation of the second short cut is requested or a point in time when the mode of the processor 460 is switched to DEX mode.

According to an embodiment, the processor 460 may determine whether an application (i.e., an application executed for the execution of the mapped task) involved in tasks mapped to the quick command belongs to a blacklist; when the executed application belongs to the blacklist, the processor 460 may restrict the generation of the second short cut icon of a quick command. For example, when the involved application does not belong to the blacklist, the processor 460 may allow the generation of the first short cut icon and the second short cut icon of the quick command. For another example, when the involved application belongs to the blacklist, the processor 460 may allow the generation of the first short cut icon of a quick command and may not allow the generation of the second short cut icon.

According to an embodiment, when generating the short cut icon of a quick command, the processor 460 may generate the short cut icon of a quick command indicating the number of tasks corresponding to a quick command or the content of tasks. For example, when a plurality of tasks corresponding to the quick command are a music playing task and a text sending task, the processor 460 may generate the short cut icon of a quick command including a note image indicating the music playing task and a letter image indicating the text sending task.

According to an embodiment, in addition to the short cut icon and the link information, the short cut information of a quick command may further include security setting information about a short cut name (the name or text of a short cut icon) or a task (the task mapped to the quick command) linked to a short cut icon. When generating the short cut icon of a quick command, the processor 460 may determine the short cut name of the quick command as the name corresponding to the quick command (the selected word, phrase, or sentence). For another example, when the security for the task linked to the short cut icon of a quick command is set, the processor 460 may store short cut information of the quick command including the security setting information.

According to an embodiment, the processor 460 may provide an interface capable of editing at least one of pieces of short cut information of a quick command. For example, the processor 460 may provide an interface capable of editing (changing) the short cut name, setting (or changing) the short cut icon, or editing the security settings (e.g., password setting) for the short cut icon. For example, the processor 460 may provide an interface for setting a short cut icon using an image stored in a gallery folder. For another example, the processor 460 may provide an interface for setting a password for a short cut icon. According to the above-described embodiment, the processor 460 may allow the short cut icon of a quick command to include an image indicating the characteristic of the task corresponding to the quick command, and thus may allow the user to intuitively recognize the task linked to a short cut.

According to an embodiment, the processor 460 may provide an interface capable of editing a quick command, through the short cut icon of the quick command. For example, in the DEX mode, the processor 460 may provide an interface for deleting at least one of a plurality of tasks corresponding to the second short cut icon or changing the order between a plurality of tasks. According to certain embodiments, the processor 460 may provide an interface for adding a task through the second short cut icon. According to certain embodiments, the processor 460 may provide an interface for editing (deleting, changing order, or adding) a plurality of tasks corresponding to a first short cut icon, through the first short cut icon of a quick command.

According to an embodiment, the processor 460 may provide a notification for inducing the generation of the short cut icon of a quick command, based on at least one of a user preference, time, the location of the electronic device 40, or a device setting state (e.g., a manner mode, a mute mode, or a DEX mode). For example, there is a first quick command that is frequently used at a specific time slot; when the processor 460 determines that the device setting state is the mute mode or DEX mode at a specific time slot, the processor 460 may output a notification window including the content for querying whether to generate a short cut icon of the first quick command.

According to an embodiment, in the DEX mode, the processor 460 may display the second short cut or a second short cut list on at least one of a web browser, a user interface of an application program, a quick toolbar, or a home screen.

According to an embodiment, in the DEX mode, when the processor 460 displays the second short cut list on the external display device 10, the processor 460 may sort the second short cut icon list based on the usage frequency of the quick command linked to the second short cut icon and then may display the sorted result on the external display device 10. For example, the processor 460 may arrange the second short cut icon of the quick command, which is frequently used in the second short cut icon list, in the upper side.

According to an embodiment, when the short cut execution (e.g., the execution of a task of a quick command linked to a short cut icon) of a quick command is requested, the processor 460 may perform the task mapped to the quick command, based on task information linked to the short cut icon of a quick command. For example, the processor 460 may identify pieces of text data mapped to the short cut icon of a quick command, based on the task information and then may transmit the identified pieces of text data to the intelligence server 60. The processor 460 may receive plans corresponding to pieces of text data from the intelligence server 60 and then may perform a plurality of tasks based on the received plans.

According to the above-described embodiment, the electronic device 40 may generate the short cut icon of a quick command for performing a quick command based on a touch (or mouse) input, and thus allowing the user to easily employ the task mapped to the quick command, even in the situation where it is difficult or uncomfortable for the user to speak.

According to an embodiment, an electronic device (e.g., the electronic device 40 of FIG. 4) may include a display (e.g., the display 420 of FIG. 4), a microphone (e.g., the microphone 410 of FIG. 4), a communication circuit (e.g., the communication circuit 440 of FIG. 4), a processor (e.g., the processor 460 of FIG. 4) operatively connected to the display, the microphone, and the communication circuit, and a memory (e.g., the memory 450 of FIG. 4) operatively connected to the processor. The memory may store instructions that, when executed, cause the processor, in a first action at a point in time when the electronic device is not connected to an external display device (e.g., the external display device 10 of FIG. 1), to receive a first user utterance through the microphone, to perform a task, which is included in the first user utterance, which is mapped to a selected word, phrase, or sentence, and which is customized by a user, using at least part of the electronic device, and, in a second action at a point in time when the electronic device is connected to the external display device wiredly or wirelessly, using the communication circuit, to display a text and/or a graphic user interface (GUI) indicating the selected word, phrase, or sentence, on the external display device.

The customized task may include a plurality of actions.

The customized task may include a plurality of actions using a plurality of applications.

The communication circuit may include universal serial bus (USB), HDMI, D-SUB or optical interface.

The selected word, phrase, or sentence may be specified by an input of the user, may be generated based on utterances of the user, or may be provided from another electronic device.

The text and/or the GUI may be displayed on at least one of a web browser, a user interface of an application program, a quick toolbar, or a home screen.

The instructions may cause the processor, in the first action, to display the text and/or the GUI indicating the selected word, phrase, or sentence on the display.

The instructions may cause the processor, in the second action, to change and set the customized task, based on editing of the text and/or the GUI.

According to an embodiment, when the customized task includes a plurality of actions, the editing may include at least one of changing an order between the plurality of actions or deleting at least one of the plurality of actions.

The instructions may further cause the processor, in the second action, to change the selected word, phrase or sentence, based on editing of the text and/or the GUI.

The instructions may cause the processor to identify an application corresponding to the customized task when identifying an execution request for the text and/or the GUI, and to selectively output an execution screen of the identified application on the external display device or the display based on whether the identified application belongs to a specified list.

The instructions may cause the processor to provide a notification for inducing generation of the text and/or the GUI, based on at least one of user preference, time, a location of the electronic device, or a device setting state of the electronic device.

According to an embodiment, the selected word, phrase, or sentence may be a quick command, and the text and/or the GUI may be a short cut menu or list corresponding to the quick command. In this case, when the quick command includes a plurality of quick commands, the instructions may further cause the processor to sort a plurality of short cut menus or icons corresponding to the quick command, based on a usage frequency of the plurality of quick commands to display the sorted result on the external display device.

According to an embodiment, an electronic device (e.g., the electronic device 40 of FIG. 4) may include a display (e.g., the display 420 of FIG. 4), a microphone (e.g., the microphone 410 of FIG. 4), a processor (e.g., the processor 460 of FIG. 4) operatively connected to the display and the microphone, and a memory (e.g., the memory 450 of FIG. 4) operatively connected to the processor. The memory may store instructions that, when executed, cause the processor to receive a first user utterance through the microphone, to perform a task, which is included in the first user utterance, which is mapped to a selected word, phrase, or sentence, and which is customized by a user, using at least part of the electronic device, and to display a text and/or a GUI indicating the selected word, phrase, or sentence on the display, based on settings for the word, phrase, or sentence.

Figure 5:
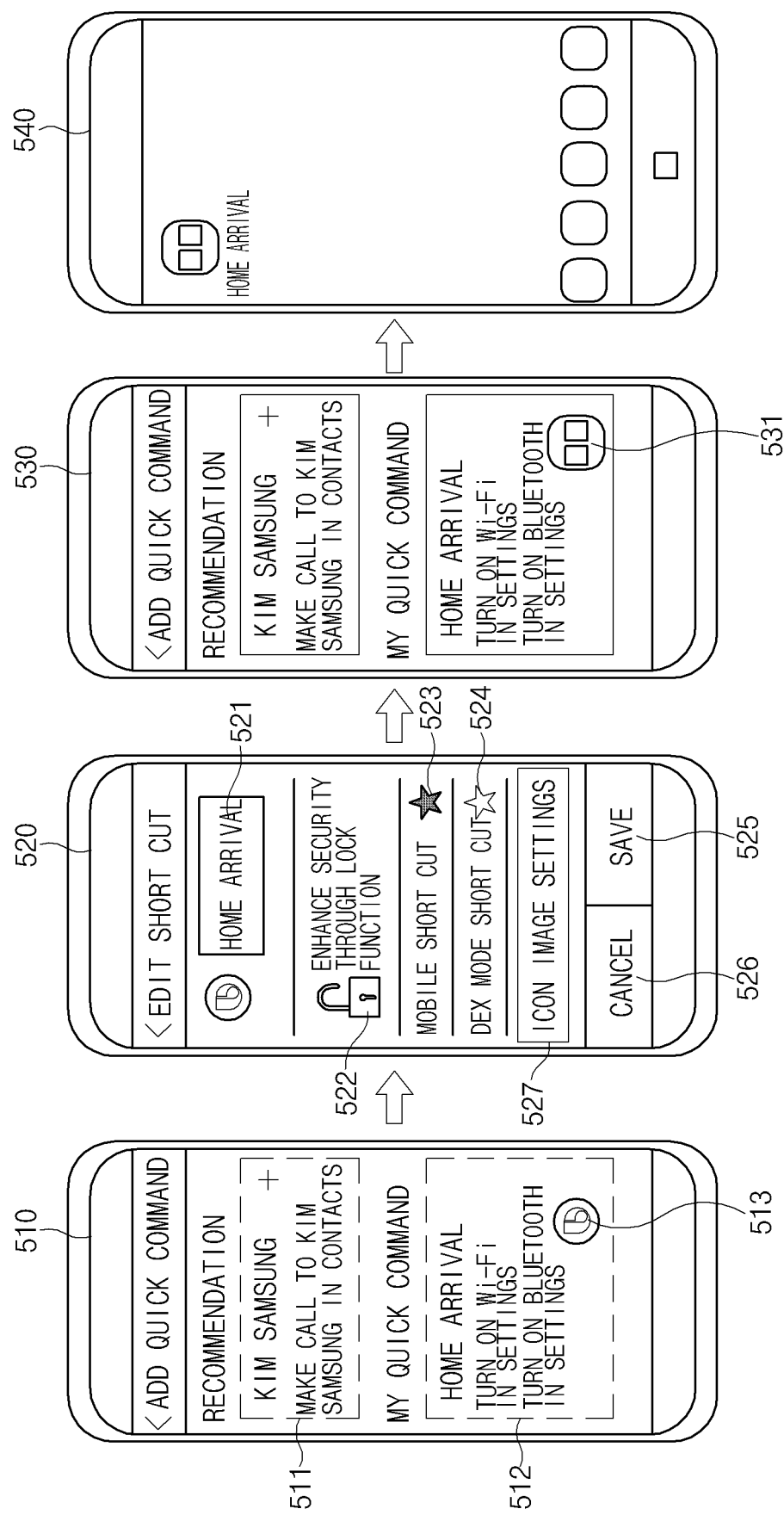
FIG. 5 illustrates a UI screen including a quick command editing interface, according to an embodiment.

FIG. 5 illustrates a UI screen including a quick command editing interface, according to an embodiment.

Referring to FIG. 5, when display of a quick command list is requested, the processor 460 (e.g., the processor 460 of FIG. 4) may output a first UI screen 510, including a recommendation quick command list 511 received from the intelligence server 60 (e.g., the intelligence server 60 of FIG. 3), and a quick command list 512 indicating quick commands already registered in the electronic device 40. The first UI screen 510 may be a screen in which a first image 513 is displayed as a virtual button for a 'home arrival' quick command in a quick command list. The first image 513 or virtual button may visually identify the 'home arrival' voice input-based quick command (e.g., a voice quick command).

Responsive to receiving an input to the virtual button 513 included in the first UI screen 510, the processor 460 may output a second UI screen 520, which allows editing of short cut information included within the 'home arrival' quick command. The second UI screen 520 may include a first region 521 for setting a short cut name, and a second region 522 for setting the lock function of the short cut. The second UI screen 520 may further include a virtual button 523 for setting or unsetting the first short cut, a virtual button 524 for setting or unsetting the second short cut, a save button 525 for storing a present configuration of the short cut for the quick command, and a cancel button 526 for canceling any changes with respect to the short cut.

When the first region 521 is selected (e.g., touched), the processor 460 may provide an interface allowing a user to change the short cut name of the 'home arrival' quick command. When the second region 522 is selected, the processor 460 may provide an interface allowing a user to set a password of the short cut icon for the 'home arrival' quick command. When the virtual button 523 is checked (e.g., touched an odd number of times), the processor 460 may determine that the generation of the first short cut for the 'home arrival' quick command is set; and when the check for the virtual button 523 is released (e.g., touched an even number of times), the processor 460 may determine that the generation of the first short cut of the 'home arrival' quick command is deselected or otherwise unset. When the virtual button 524 is checked (e.g., touched an odd number of times), the processor 460 may determine that the generation of the second short cut of the 'home arrival' quick command is requested; when the check for the virtual button 524 is released (e.g., touched an even number of times), the processor 460 may determine that the generation of the second short cut of the 'home arrival' quick command is unset.

In a state where the generation of the first short cut is set through the virtual button 523 of the second UI screen 520, when receiving an input to the save button 525, the processor 460 may generate the first short cut icon of the 'home arrival' quick command and may output a third UI screen 530 including the first short cut icon. The third UI screen 530 may be a screen in which an image 531 is displayed as the first short cut icon in the 'home arrival' quick command information in a quick command list. The image 531 corresponding to the first short cut icon may indicate that the 'home arrival' quick command is a visual quick command supporting a touch (or mouse) input. The first short cut image 531 may be the same with respect to all the quick commands or may be different for each quick command.

When settings of an icon image are requested through a virtual button 527, the processor 460 may provide an interface capable of setting an image in a gallery to a short cut image of a quick command.

When receiving an input to the save button 525 in the second UI screen 520, the processor 460 may generate the short cut (at least one of the first short cut or the second short cut) of the 'home arrival' quick command, by reflecting the editing of short cut information of the 'home arrival' quick command.

When a screen (e.g., the last page in the home screen), in which the short cut icon of the 'home arrival' quick command is displayed, is selected, the processor 460 may display a fourth screen 540 including the first short cut icon of the 'home arrival' quick command.

Figure 6:
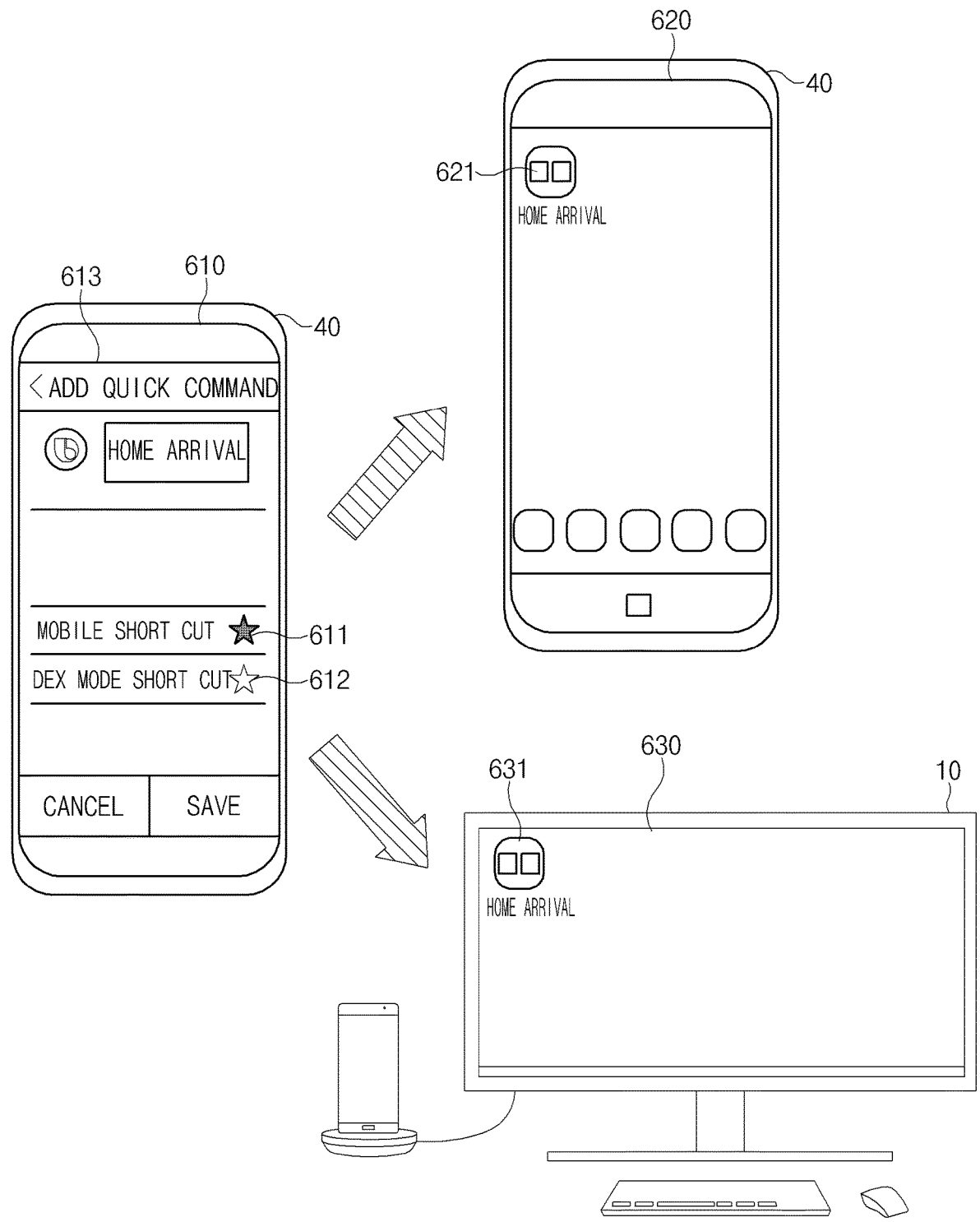
FIG. 6 is an example of a UI screen for the generation of a short cut of a quick command, according to an embodiment.

FIG. 6 is an example of a UI screen for the generation of a short cut of a quick command, according to an embodiment.

Referring to FIG. 6, a normal mode is depicted in which the electronic device 40 (e.g., the electronic device 40 of FIG. 1) is not connected to an external display device 10. In this mode, the electronic device 40 may provide a UI screen 610 which may facilitate generation of short cut icons for quick commands. This may be one of a plurality of editing interfaces for a 'home arrival' quick command. The UI screen 610 may include a virtual button 611 for selecting (e.g., setting or unsetting) generation of the short cut icon (hereinafter, referred to as a 'first short cut icon') for a quick command in the normal mode, and a virtual button 612 for selecting (e.g., setting or unsetting) the generation of the short cut icon (hereinafter, referred to as a 'second short cut icon') for a quick command in a DEX mode. A second short cut icon 631 may include a short cut image processed in a format capable of display on the external display device 10 (e.g., the external display device 10 of FIG. 1). According to certain embodiments, the electronic device 40 may output the UI screen 610 in the DEX mode, or in a screen obtained by recreating the UI screen 610 on the external display device 10 (e.g., a mirror or duplication display mode).

When the generation of the first short cut is set through virtual button 611, the electronic device 40 may generate a first short cut icon 621 of a quick command 613 of 'home arrival'. The electronic device 40 may display the generated first short cut icon 621 on a screen 620 (e.g., a home screen) of the electronic device 40 in the normal mode. The normal mode may be a standalone mode in which the electronic device 40 is not connected to the external display device 10. For example, when the 'home arrival' quick command is mapped to two tasks, the electronic device 40 may generate the first short cut icon 621 including two images corresponding to characteristics of the two tasks.

When the generation of the second short cut is set through the virtual button 612, the electronic device 40 may generate the second short cut icon 631 of the quick command 613. The electronic device 40 may display the generated second short cut icon 631 on a screen 630 (e.g., a home screen) of the external display device 10 in the DEX mode. The DEX mode may be a mode in which the electronic device 40 is connected to the external display device 10. For example, when the 'home arrival' quick command is mapped to two tasks, the electronic device 40 may generate the second short cut icon 631 including two images corresponding to characteristics of the two tasks.

Figure 7:
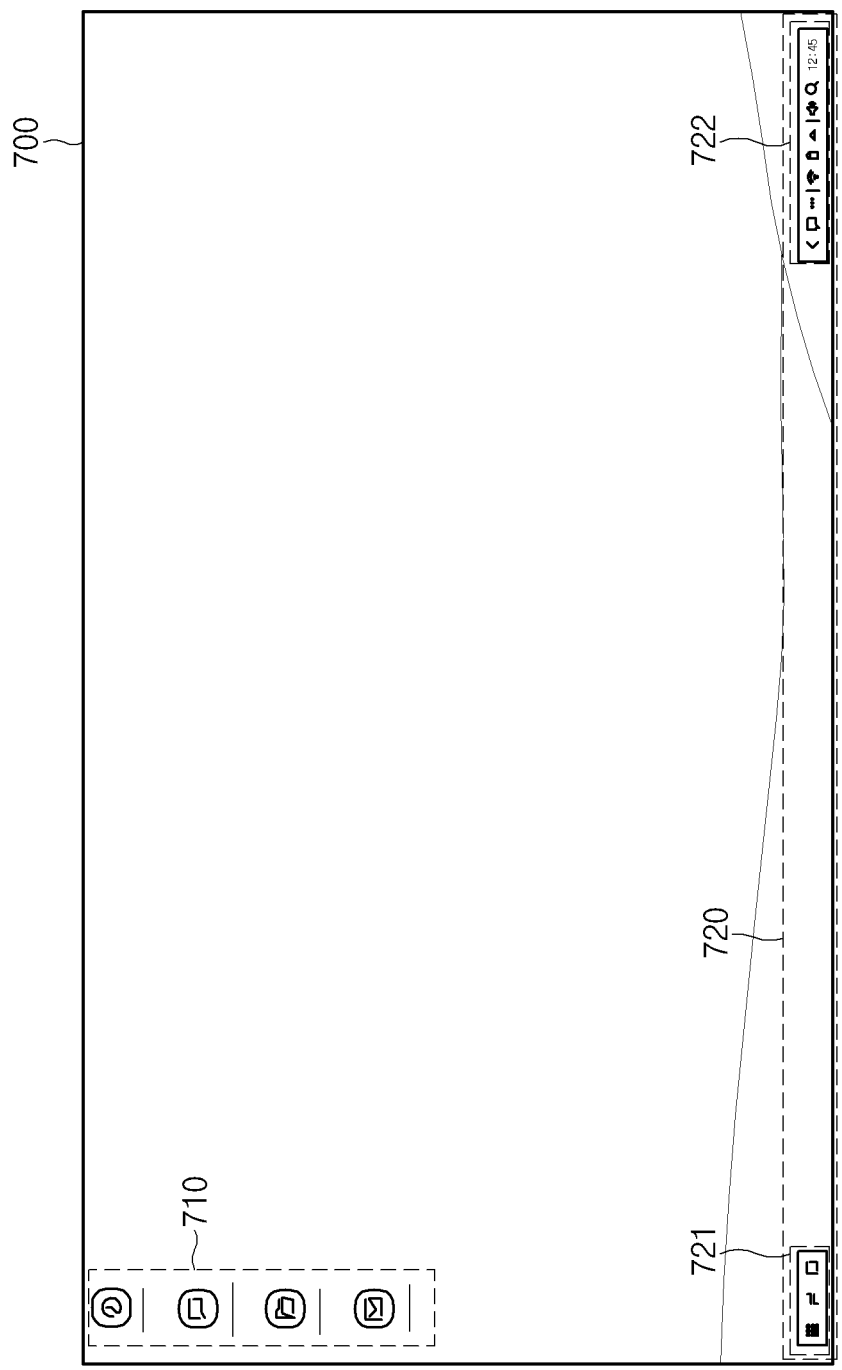
FIG. 7 illustrates a home screen of an external display device 10, according to an embodiment.

FIG. 7 illustrates a home screen of the external display device 10 (e.g., the external display device 10 of FIG. 1), according to an embodiment.

Referring to FIG. 7, in a DEX mode, the electronic device 40 (e.g., the electronic device 40 of FIG. 1) may implement a home screen corresponding to the external display device 10 based on the home screen of the electronic device 40 and may output the implemented home screen on the external display device 10. A home screen 700 may include a region 710 including a short cut icon of an application and a task bar 720. The short cut icon of the application may be a short cut icon for executing an application used frequently. The task bar 720 may include a quick toolbar 721 and a state display panel 722. The quick toolbar 721 may include an icon allocated to a specific function (e.g., the function to display a search window including short cut icons of all applications installed in the electronic device 40) of the electronic device 40. The state display panel 722 may be a region for displaying a notification or a system state.

In the DEX mode, the electronic device 40 may display the short cut icon of a quick command on at least part of the home screen. For example, the electronic device 40 may display the short cut icon of a quick command on a part of the task bar 720. For another example, the electronic device 40 may display at least one of the short cut icon or the text (e.g., a short cut name) of a quick command on a region (e.g., the region 710) other than the task bar 720, in the form of a web browser or a user interface of an application.

Figure 8:
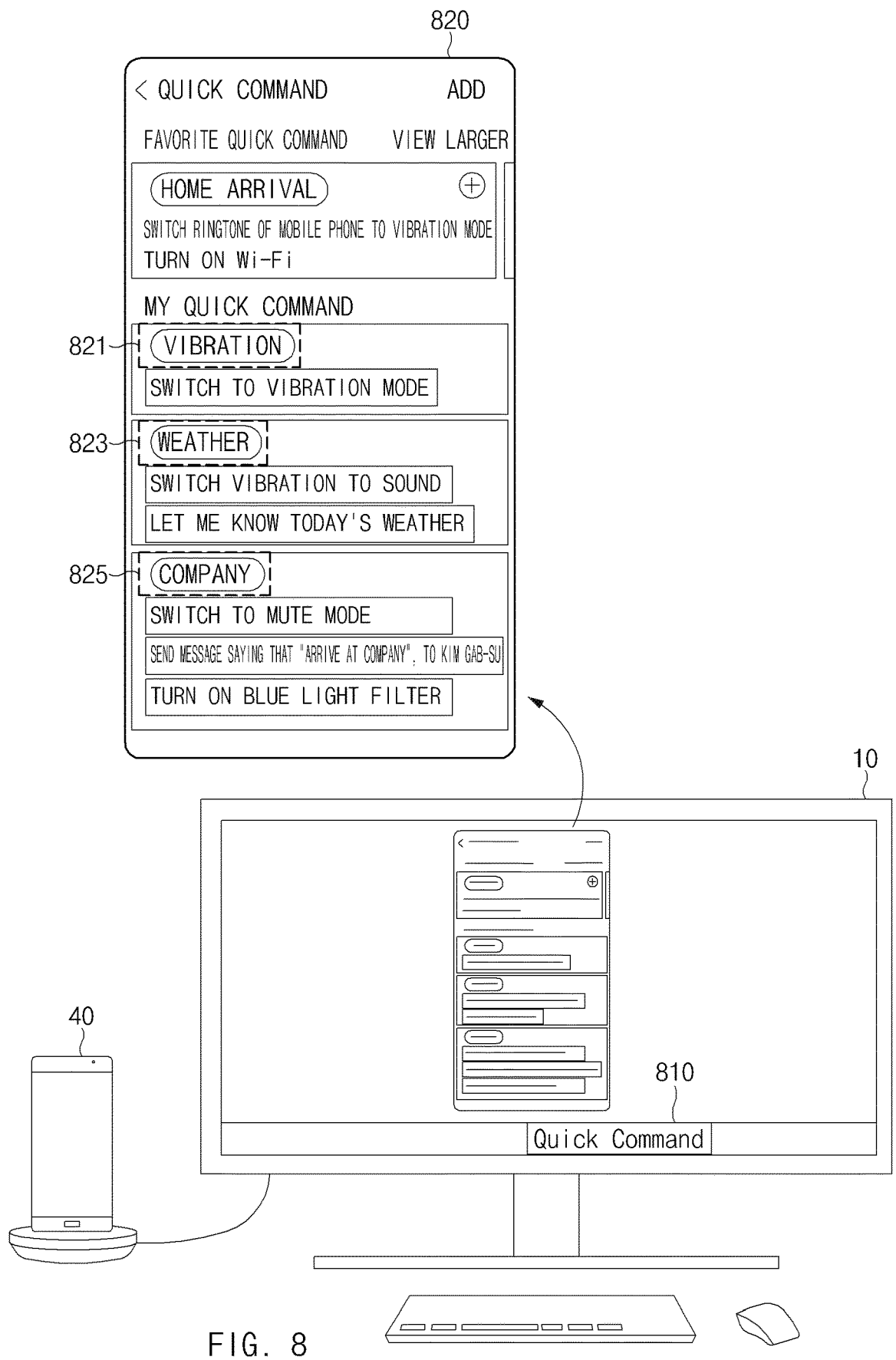
FIG. 8 is an example of a second short cut icon of a quick command, according to an embodiment.

FIG. 8 is an example of a second short cut icon of a quick command, according to an embodiment.

Referring to FIG. 8, according to an embodiment, in a DEX mode, the electronic device 40 (e.g., the electronic device 40 of FIG. 1) may display a virtual first tool 810 for searching for a second short cut list, on the task bar 720 of the home screen displayed on the external display device 10. When the first tool 810 is selected (e.g., double click), the electronic device 40 may output a UI screen 820 including the second short cut list, to the external display device 10. In the UI screen 820, vibration 821, weather 823, and a company 825 may be second short cut items corresponding to a 'vibration' quick command, a 'weather' quick command, and a 'company' quick command, respectively.

When one item is selected among the second short cut list included in the UI screen 820, the electronic device 40 may perform the task linked to the selected second short cut. For example, when the second short cut icon 821 of a 'vibration' quick command is selected, the electronic device 40 may perform the task of changing the mode of the electronic device 40 to a manner mode, which is the task linked to the second short cut icon 821 of the 'vibration' quick command. The second short cut icon 821 of the 'vibration' quick command may be selected based on a right-click or a double-click by the external input device 30 in a state where the cursor of the external input device 30 is positioned on the second short cut icon 821 of the 'vibration' quick command. When the mode of the electronic device 40 is changed to the manner mode, the electronic device 40 may output (e.g., display a screen) the result according to manner mode change, to at least one of the electronic device 40 or the external display device 10.

Figure 9:
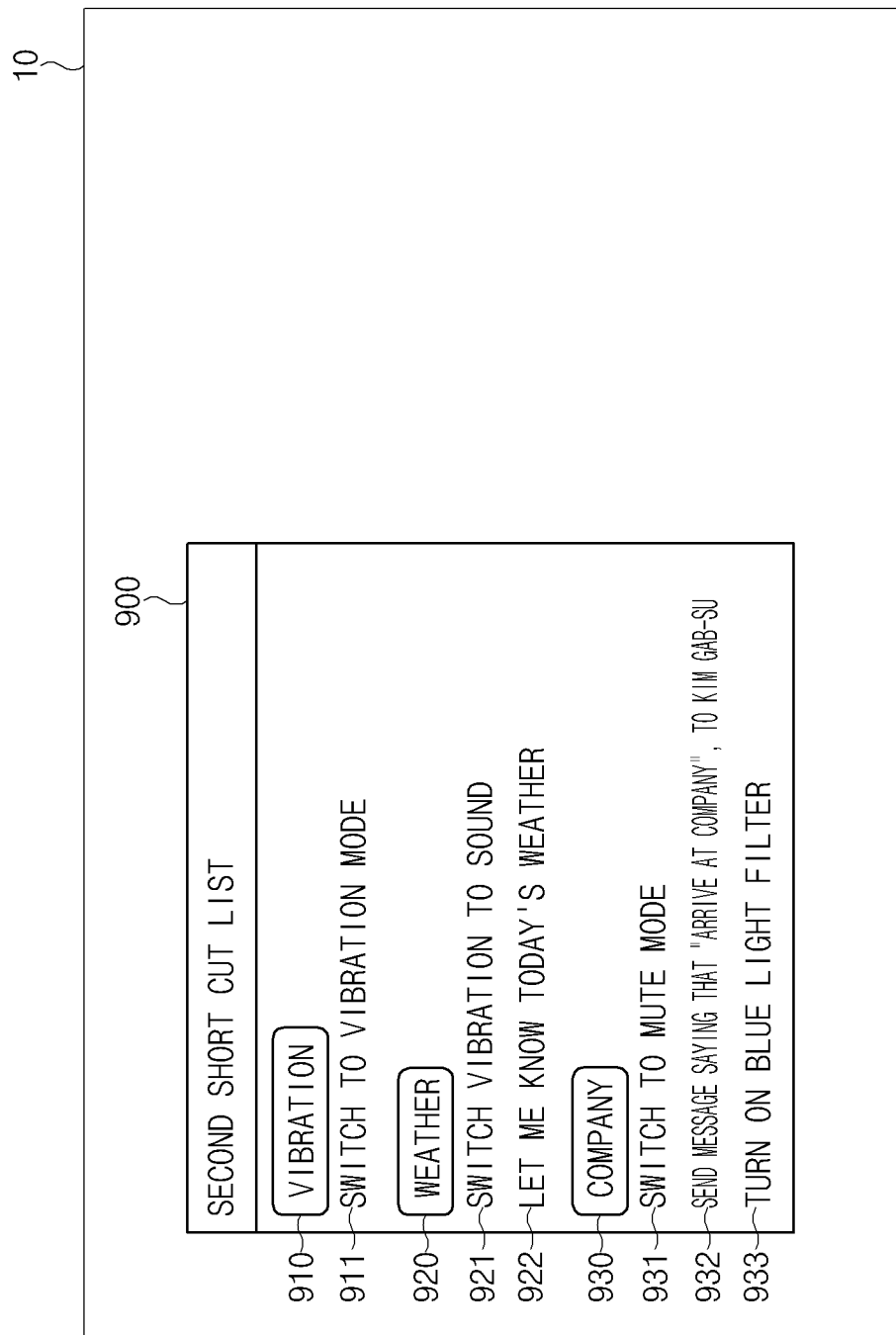
FIG. 9 is another example of a second short cut icon of a quick command, according to an embodiment.

FIG. 9 is another example of a second short cut icon of a quick command, according to an embodiment.

Referring to FIG. 9, in a DEX mode, the electronic device 40 may output a window 900 including a second short cut list including a quick command name, on the external display device 10. For example, the window 900 may include second short cut items 910, 920, and 930 of each quick command and pieces of text data 911, 921, 922, 931, 932, and 933 that are mapped to the second short cut items 910, 920, and 930.

The electronic device 40 may edit a task (or the task of a quick command linked to the second short cut icon) mapped to the second short cut items 910, 920, and 930, based on the editing of pieces of text data 911, 921, 922, 931, 932, and 933 mapped to the second short cut items 910, 920, and 930. For example, when a user makes a request for the deletion of one (e.g., "turn on blue light filter" text data 933) of pieces of text data 931, 932, and 933 mapped to the 'company' second short cut 930, the electronic device 40 may delete a task (i.e., a task of activating a blue light filter), which is mapped to the deleted text data 933, from among tasks mapped to the 'company' second short cut icon 930. In this case, the electronic device 40 may delete a task of activating a blue light filter among tasks corresponding to the 'company' quick command. The electronic device 40 may add (e.g., paste) the deleted text data 933 as text data mapped to the short cut icon of another quick command. In this case, another quick command and the task mapped to the short cut icon of the other quick command may be changed.

Figure 10:
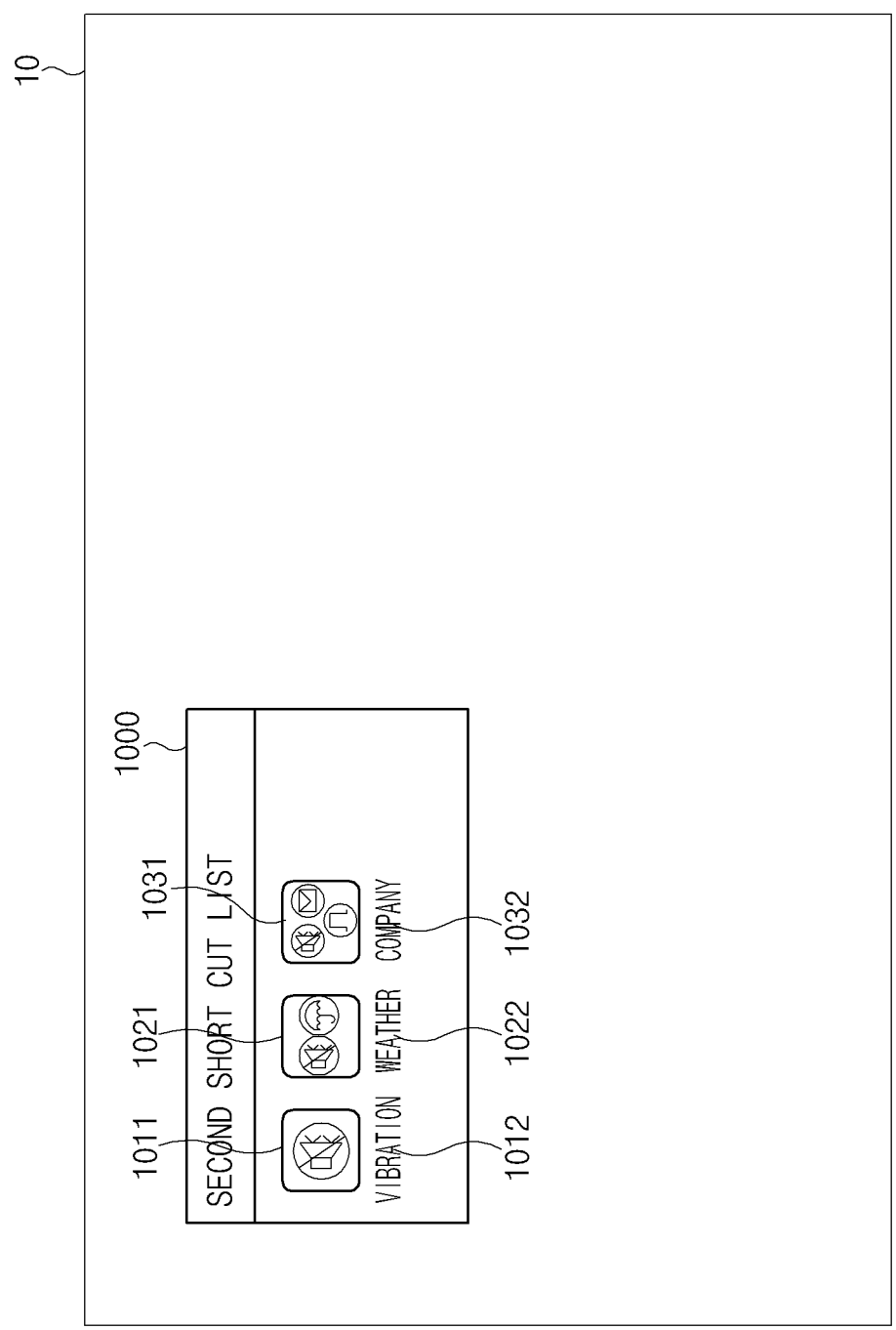
FIG. 10 is still another example of a second short cut icon of a quick command, according to an embodiment.

FIG. 10 is still another example of a second short cut icon of a quick command, according to an embodiment.

Referring to FIG. 10, according to an embodiment, in a DEX mode, the electronic device 40 (e.g., the electronic device 40 of FIG. 1) may display a window 1000 including a second short cut list including a second short cut name (e.g., 1012) and a second short cut icon (e.g., 1011) of each quick command, on the external display device 10.

According to an embodiment, the electronic device 40 may edit a quick command corresponding to a second short cut icon or a second short cut, based on a user input (e.g., editing) of second short cut information. For example, when the second short cut name 1022 of the 'weather' quick command is selected, the electronic device 40 may provide an editing interface for the second short cut name of the 'weather' quick command. When the second short cut name of the 'weather' quick command is changed, the electronic device 40 may change and store a quick command (the selected word, phrase, or sentence) based on the changed second short cut name. When the name of the 'weather' second short cut is changed to "morning", the electronic device 40 may change the 'weather' quick command to "morning". For another example, the electronic device 40 may display text data mapped to the second short cut icon 1021 of the 'weather' quick command, as attribute information of the second short cut icon 1021 of the 'weather' quick command. A third example can be seen in the 'company' third short cut icon 1031, and the third short cut name 1032. When editing (e.g., deleting, or changing order) one pieces of text data mapped to the second short cut icon 1021 of a 'weather' quick command, the electronic device 40 may delete tasks corresponding to the 'weather' quick command based on the edited text data or may change the order of tasks corresponding to the 'weather' quick command based on the edited text data.

Figure 11:
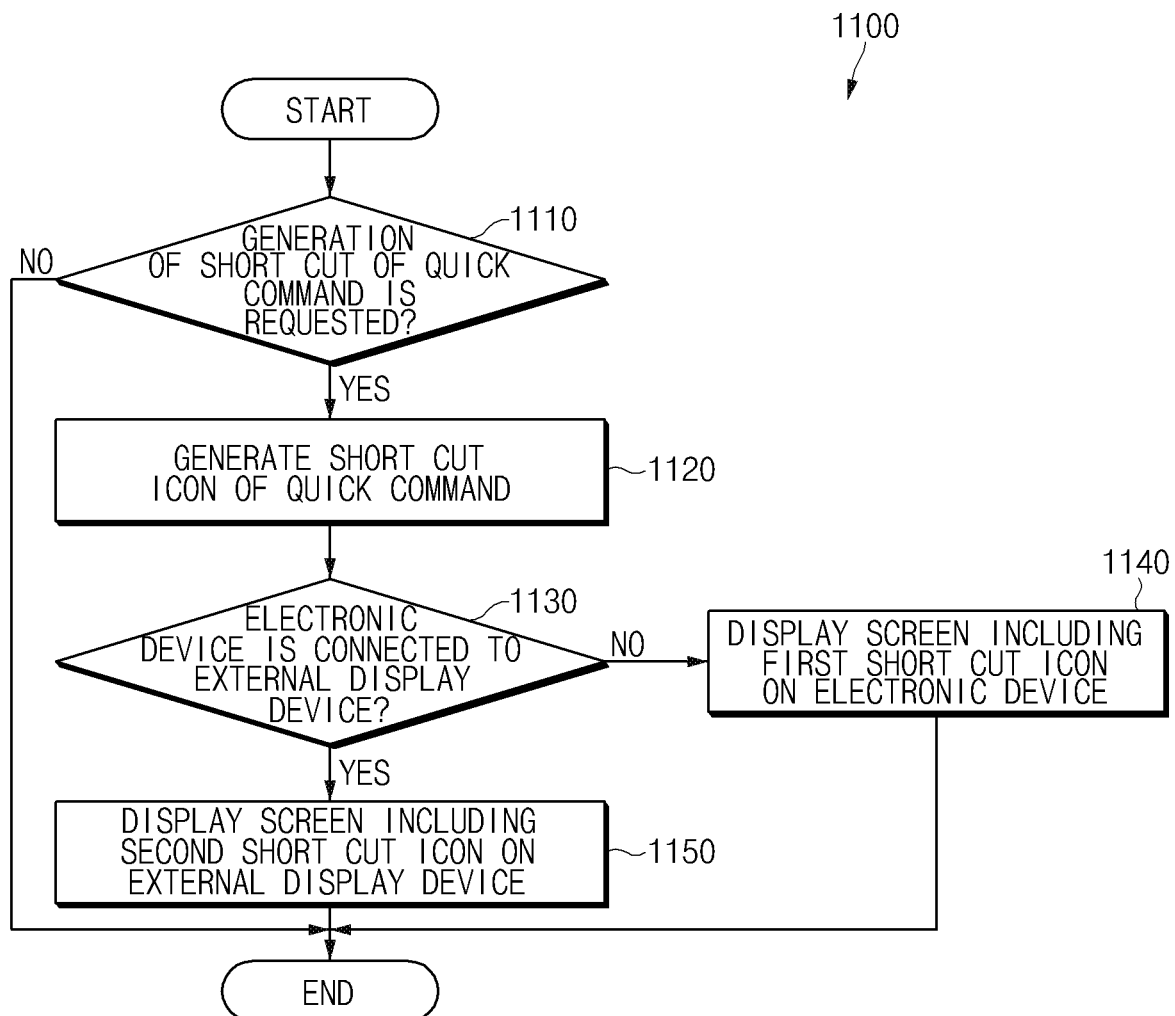
FIG. 11 illustrates an example of a short cut generating method of a quick command, according to an embodiment.

FIG. 11 illustrates an example 1100 of a short cut generating method of a quick command, according to an embodiment.

Referring to FIG. 11, when the generation of the short cut for a quick command is requested in operation 1110, the electronic device 40 (e.g., the electronic device 40 of FIG. 1) may generate the short cut icon (e.g., a first short cut icon and a second short cut icon) for a quick command in operation 1120. For example, the electronic device 40 may output a quick command list according to a user input, identify a quick command (the short cut for which is to be generated) in the output quick command list, and generate a short cut icon with respect to the identified quick command. The first short cut icon may be an icon displayed on the electronic device 40. The second short cut icon may be an icon displayed on the external display device 10.

In operation 1130, the electronic device 40 may determine whether the electronic device 40 is communicatively coupled to the external display device 10 through the communication circuit 440.

When the electronic device 40 is not connected to the external display device 10 (i.e., operation in a normal mode), in operation 1140, the electronic device 40 may display a screen including a first short cut icon on the electronic device 40. For example, the processor 460 may output the first short cut icon on the display 420, based on the first short cut information of the quick command, in a normal mode.

When the electronic device 40 is connected to the external display device 10 (a DEX mode), in operation 1150, the electronic device 40 may generate a screen (e.g., a home screen) including the second short cut icon and may display the generated screen on the external display device 10. For example, the processor 460 may output the second short cut icon on the external display device 10, based on the second short cut information in the DEX mode. When the generation of the second short cut of a quick command is not requested, the electronic device 40 may output a screen not including the second short cut icon, on the external display device 10.

According to certain embodiments, when receiving a voice input to make a request for the generation of the short cut of a quick command, the electronic device 40 may generate the short cut icon of a quick command.

Figure 12:
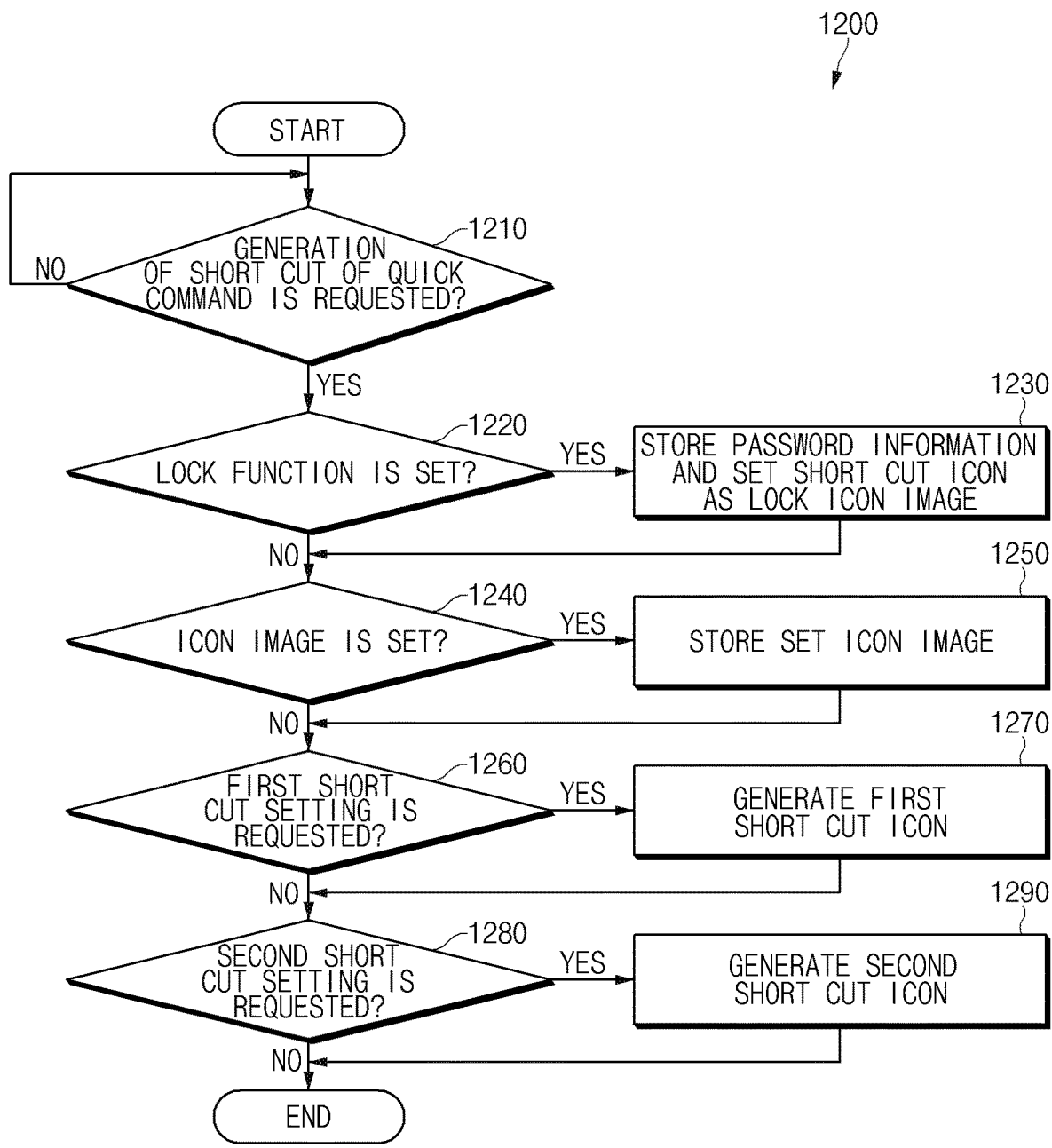
FIG. 12 illustrates another example of a short cut generating method of a quick command, according to an embodiment.

FIG. 12 illustrates another example 1200 of a short cut generating method of a quick command, according to an embodiment.

Referring to FIG. 12, in operation 1210, the electronic device 40 (e.g., the electronic device 40 of FIG. 1) may determine whether the short cut settings of a quick command is requested. For example, when receiving an input to the save button 525 on a UI screen (e.g., 620 of FIG. 6) for setting the short cut of a quick command, the electronic device 40 may determine that the settings of short cut icon is edited.

In operation 1220, the electronic device 40 may determine whether the lock function is set for the short cut icon of a quick command. When the lock function is set, in operation 1230, the electronic device 40 may store password information about the short cut icon of a quick command and may store the short cut icon of a quick command as a lock icon image.

In operation 1240, the electronic device 40 may determine whether the short cut icon image is set by a user. For example, the electronic device 40 may determine whether the icon image set by the user is present, in addition to an icon image set by default.

When the image of a short cut icon is set by the user, in operation 1250, the electronic device 40 may store the short cut icon of a quick command, as the icon image set by the user. In operation 1220, when the lock function for the short cut icon of a quick command is set, in operation 1250, the electronic device 40 may combine the icon image set by the user, with at least part of lock icon images.

When identifying first short cut settings in operation 1260, the electronic device 40 may generate a first short cut icon in operation 1270.

When identifying second short cut settings in operation 1280, the electronic device 40 may generate a second short cut icon in operation 1290.

Operation 1220, operation 1240, operation 1260, and operation 1280 may not be performed sequentially. Moreover, even though a specific order is not set, it is not impossible to make other settings.

Figure 13:
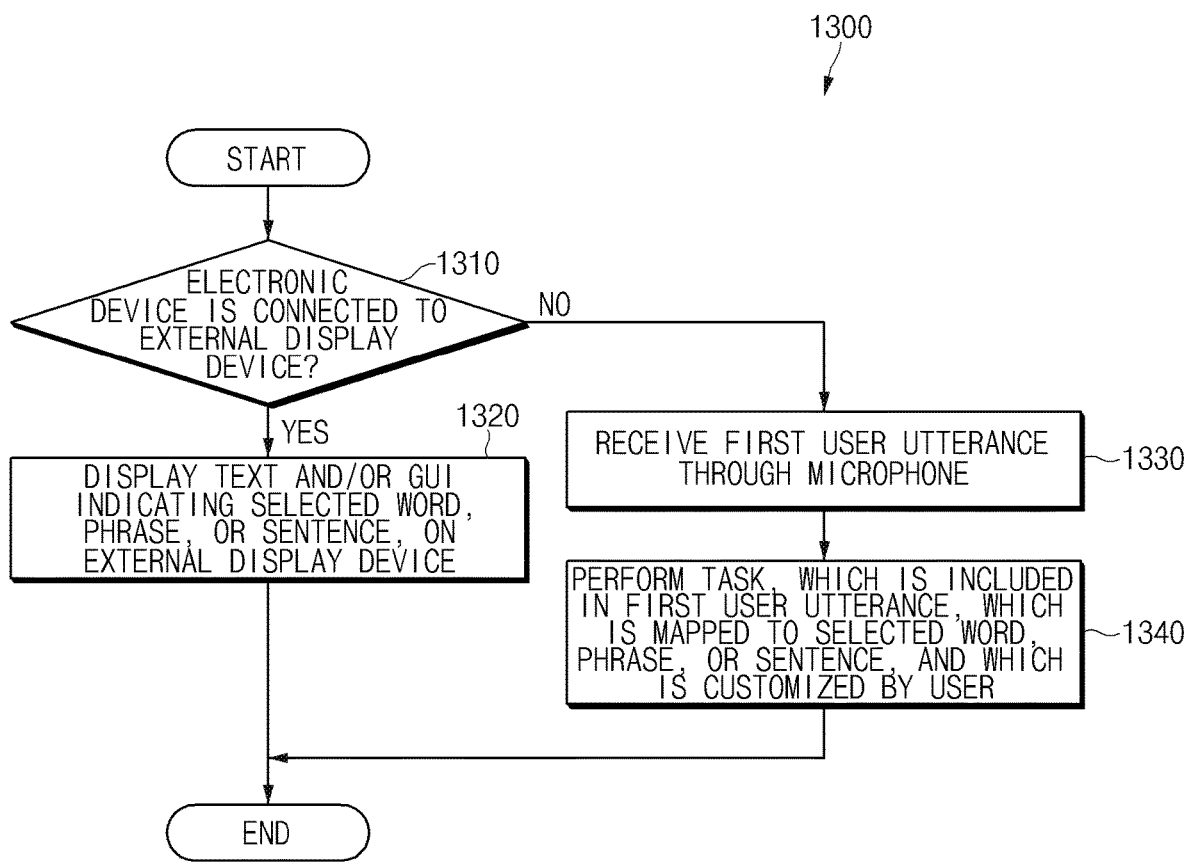
FIG. 13 illustrates still another example of a short cut generating method of a quick command, according to an embodiment.

FIG. 13 illustrates still another example 1300 of a short cut generating method of a quick command, according to an embodiment.

Referring to FIG. 13, in operation 1310, the electronic device 40 may determine whether the electronic device 40 is connected to the external display device 10.

In operation 1320, after determining that the electronic device 40 is connected to the external display device 10 (a DEX mode, the second action), in operation 1320, the electronic device 40 may display a text and/or a GUI indicating the selected word, phrase, or sentence (e.g., from a previous user utterance/user voice command, on the external display device 10. The text and/or the GUI may correspond to the above-described second short cut icon.

In operation 1330, when the electronic device 40 is not connected to the external display device 10 (a normal mode, the first action), the electronic device 40 may receive a first user utterance through the microphone 410.

In operation 1340, the electronic device 40 may execute the task or grouping of processes, which is included in the first user utterance, which is mapped to the selected word, phrase, or sentence, and previously customized by a user. For example, the task customized by the user may include execution of a plurality of computing actions using a plurality of application programs.

According to an embodiment, a short cut generating method by an electronic device may include determining whether the electronic device is connected to an external display device, receiving a first user utterance through a microphone when the electronic device is not connected to the external display device, performing a task, which is included in the first user utterance, which is mapped to a selected word, phrase, or sentence, and which is customized by a user, using at least part of the electronic device, and displaying a text and/or a GUI indicating the selected word, phrase, or sentence, on the external display device when the electronic device is connected to the external display device.

The displaying of the text and/or the GUI indicating the selected word, phrase, or sentence on the external display device may include receiving editing of the text and/or the GUI and changing and setting the customized task, based on the editing of the text and/or the GUI.

According to an embodiment, the short cut generating method may further include receiving editing of the text and/or the GUI and changing the word, phrase, or sentence based on the received editing.

According to an embodiment, the short cut generating method may further include identifying an application corresponding to the customized task when identifying an execution request for the text and/or the GUI, and selectively outputting an execution screen of the identified application on the external display device or the display based on whether the identified application belongs to a specified list.

According to an embodiment, the short cut generating method may further include providing a notification for inducing generation of the text and/or the GUI, based on at least one of user preference, time, a location of the electronic device, or a device setting state of the electronic device.

According to an embodiment, the selected word, phrase, or sentence may be a quick command, and the text and/or the GUI may be a short cut menu or icon corresponding to the quick command. In this case, the displaying of the text and/or the GUI indicating the selected word, phrase, or sentence, on the external display device may include sorting a plurality of short cut menus or icons corresponding to the quick command, based on a usage frequency of the plurality of quick commands to display the sorted result on the external display device when the quick command includes a plurality of quick commands.

Figure 14:
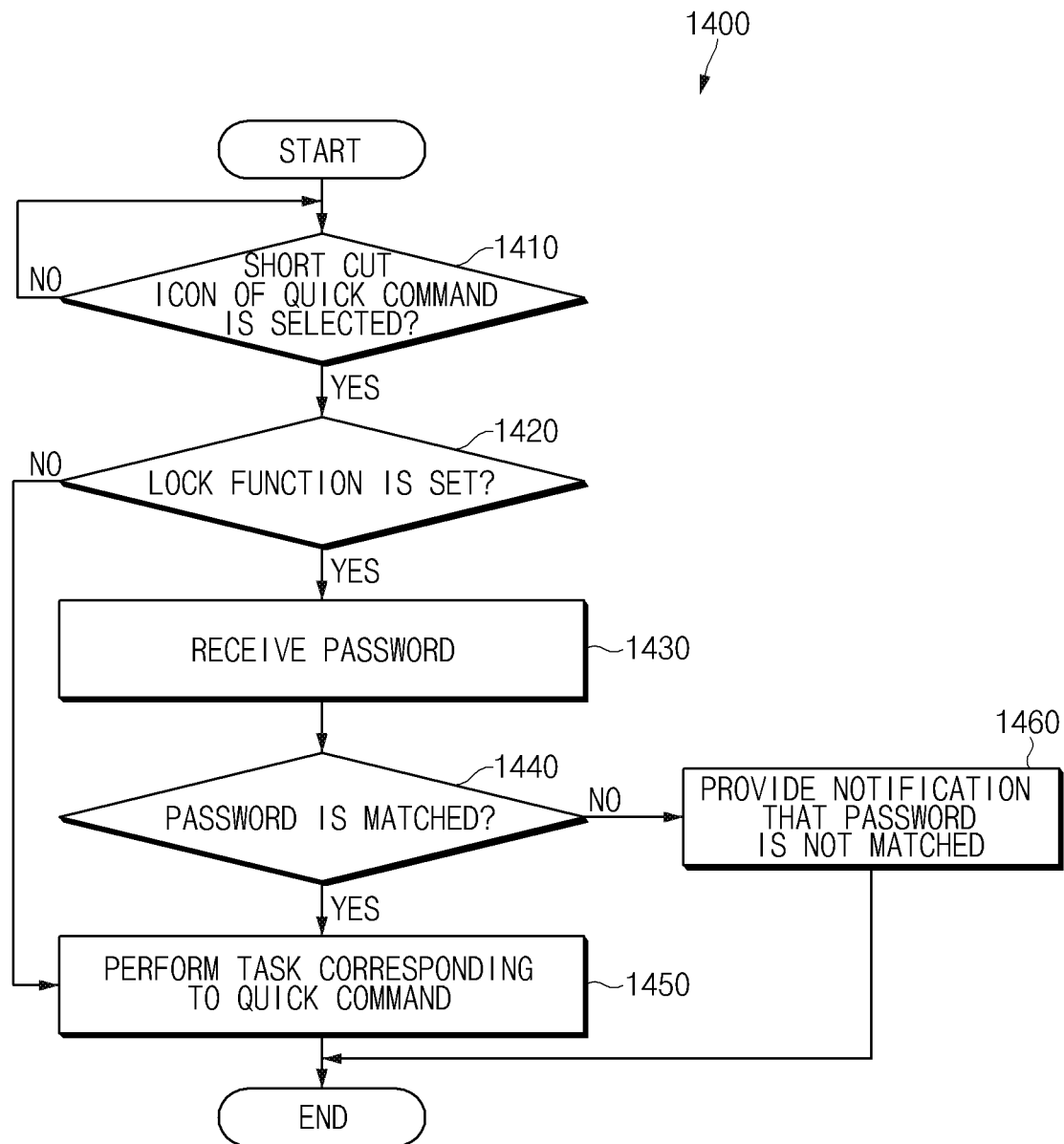
FIG. 14 illustrates a short cut executing method of a quick command.

FIG. 14 illustrates a short cut executing method 1400 of a quick command.

Referring to FIG. 14, in operation 1410, the electronic device 40 (e.g., the electronic device 40 of FIG. 1) may determine whether the short cut icon of a quick command is selected. For example, when identifying a touch to the first short cut icon in a normal mode, the electronic device 40 may determine that the first short cut icon is selected. For another example, when identifying a double click to the second short cut icon in a DEX mode, the electronic device 40 may determine that the second short cut icon is selected.

In operation 1420, the electronic device 40 may determine whether the lock function of the selected short cut icon is set.

When the lock function of the selected short cut icon is set, in operation 1430, the electronic device 40 may display a UI screen for inducing a password input and may receive a password through the output UI screen.

In operation 1440, the electronic device 40 may determine whether the received password is matched; when determining that the password is matched, in operation 1450, the electronic device 40 may perform the task linked to the short cut icon requested to be executed.

When determining that the password is not matched in operation 1440, in operation 1460, the electronic device 40 may display a UI screen for providing a notification that the password is not matched.

Figure 15:
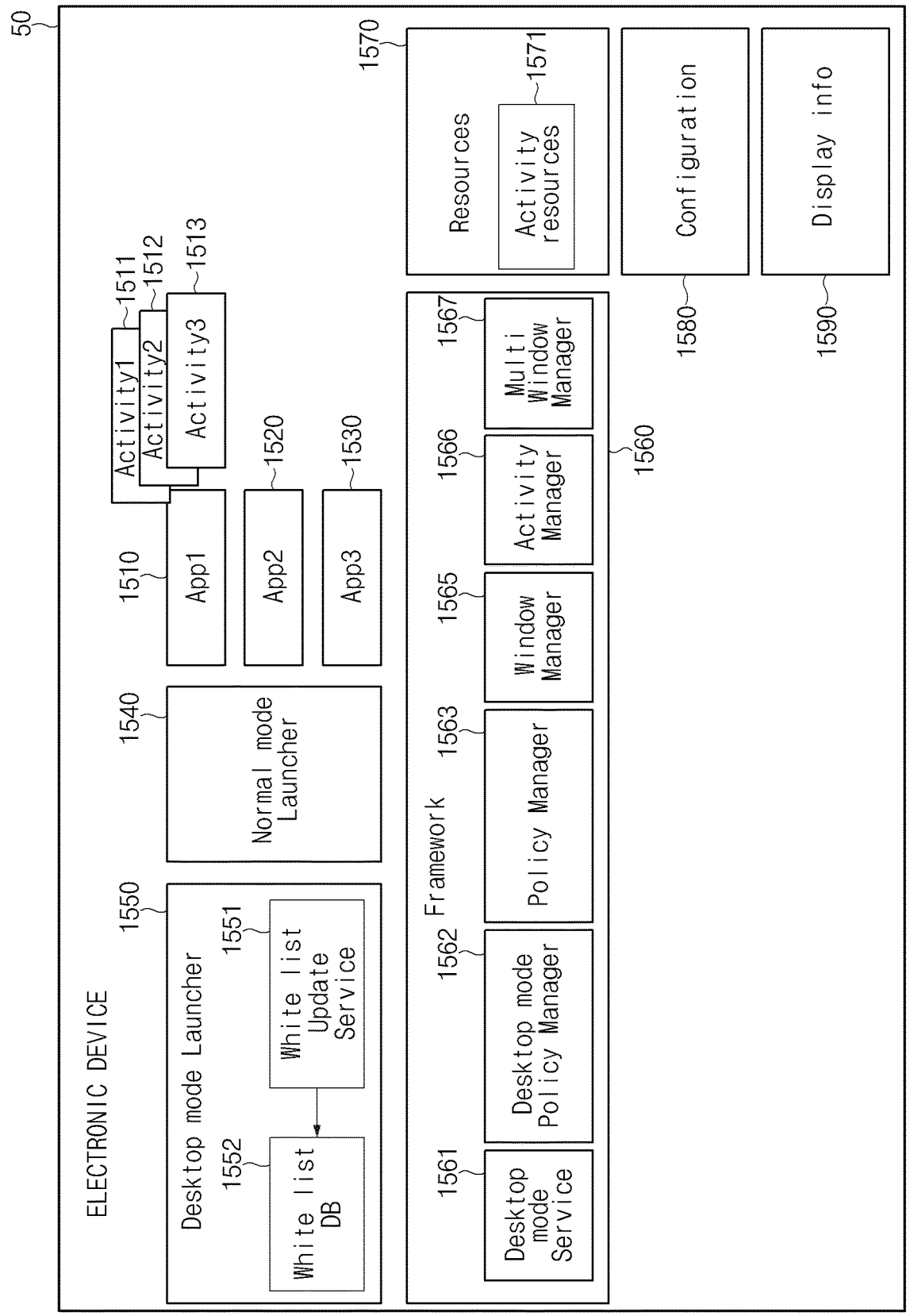
FIG. 15 is a block diagram illustrating a program module included in an electronic device, according to an embodiment.

FIG. 15 is a block diagram illustrating a program module included in an electronic device, according to an embodiment.

Referring to FIG. 15, the electronic device 40 (e.g., the electronic device 40 of FIG. 1) according to an embodiment may store a first application 1510, a second application 1520, a third application 1530, a normal mode launcher 1540, a desktop mode launcher 1550, a framework 1560, a resource 1570, a configuration 1580, and a display info 1590. The program modules illustrated in FIG. 15 may be stored in the memory of the electronic device 40 and may be executed by the processor of the electronic device 40.

The electronic device 40 may store a plurality of applications 1510, 1520, and 1530. An embodiment is exemplified FIG. 15 as the electronic device 40 stores three applications 1510, 1520, and 1530. However, embodiments may not be limited thereto. For example, the electronic device 40 may store applications of the arbitrary number. Each application may include a plurality of activities. For example, the first application 1510 may include a first activity 1511, a second activity 1512, and a third activity 1513. An embodiment is exemplified FIG. 15 as the first application 1510 includes the three activities 1511, 1512, and 1513. However, embodiments may not be limited thereto. For example, the application may include activities of the arbitrary number. The activity may utilize the screen of landscape, and may utilize the screen of portrait, or the screens of landscape and portrait.

The normal mode launcher 1540 may be executed when the electronic device 40 is not connected to the external display device 10. The normal mode launcher 1540 may provide the UI and UX of a home screen displayed on a touch screen display.

The desktop mode launcher 1550 may be executed when the electronic device 40 is connected to the external display device 10. When the electronic device 40 is connected to the external display device 10, the desktop mode launcher 1550 may provide an introduction associated with the desktop mode and may provide an option of the execution of the desktop mode or a mirroring connection option. The desktop mode launcher 1550 may provide the UI or UX similar to that of the desktop displayed on the external display device 10. The desktop mode launcher 1550 may support the resizing of a resizable window.

The desktop mode launcher 1550 may include a whitelist update service 1551 and a whitelist database 1552. The whitelist update service 1551 may obtain a whitelist, which is a list of applications supporting resizing, from the server. For example, the whitelist update service 1551 may determine whether the whitelist is updated in the server at a specified period, using an alarm service after the desktop mode launcher 1550 is executed. The whitelist update service 1551 may obtain the URI of the whitelist file, using the API provided by the content cloud server and may download the whitelist file. For another example, when the whitelist is updated, the server may transmit the whitelist to a policy manager 1563 included in the framework 1560. The policy manager 1563 may store a whitelist in a policy database. The whitelist update service 1551 may receive a whitelist from the policy manager 1563 and may store the whitelist in the whitelist database 1552. The whitelist database 1552 may store the name of an application supporting resizing and/or the name of a package. The whitelist database 1552 may store the name of an application, which supports resizing, from among applications installed in the electronic device 40 and/or the name of a package.

The framework 1560 may include a desktop mode service 1561, a desktop mode policy manager 1562, the policy manager 1563, a window manager 1565, an activity manager 1566, or a multi window manager 1567.

When the application is executed, the desktop mode service 1561 may obtain information associated with the resizing of the executed application. For example, the desktop mode service 1561 may obtain information about declaration for the resizing included in the manifest of the application, whether the application corresponds to a pre-load application, or whether the application is included in the white list.

The desktop mode policy manager 1562 may receive information obtained by the desktop mode service 1561. For the purpose of displaying the execution screen of the application based on the received information, the desktop mode policy manager 1562 may determine whether to generate the window of the first type or whether to generate the window of the second type. The desktop mode policy manager 1562 may transmit the determination result to the desktop mode service 1561 and then the desktop mode service 1561 may provide a service based on the transmitted result.

The window manager 1565 may change the configuration 1580. The window manager 1565 may generate a window based on the changed configuration 1580. For example, when the configuration 1580 is changed, the window manager 1565 may generate an event of changing the configuration 1580 and may generate a window based on the changed configuration 1580. The window manager 1565 may display an icon for providing a function such as back, minimize, maximize, and/or close to the top header of the window. For example, when generating a resizable window (pop-up window) that occupies the partial region of a screen, the window manager 1565 may display icons for providing back, minimize, maximize, and close functions in the top header of the window. For another example, when generating the resizable window occupying all regions of the screen, the window manager 1565 may display icons for providing back, minimize, switch to a pop-up window, and close functions in the top header. For another example, when generating a non-rotatable window having the fixed size, the window manager 1565 may display icons for providing back, minimize, and close functions in the top header. For another example, when generating a rotatable window having the fixed size, the window manager 1565 may display icons for providing back, rotation, minimize, and close functions in the top header.

When the configuration 1580 is changed, the activity manager 1566 may obtain the changed configuration 1580 from the window manager 1565. The activity manager 1566 may allow the manager of the resource 1570 to update the resource 1570 based on the changed configuration 1580. The activity manager 1566 may allow an application or the activity included in the application to implement a screen based on the changed configuration 1580.

For example, the multi window manager 1567 may provide a function associated with a window that is not supported by the window manager 1565. For example, the multi window manager 1567 may generate the window of the second type. For another example, the multi window manager 1567 may provide a function to minimize the window. For another example, the multi window manager 1567 may generate an additional window including an icon for providing a function such as a back, minimize, maximize, and/or close function; the multi window manager 1567 may arrange the additional window so as to be adjacent to a window in which the execution screen of an application is displayed.

The resource 1570 may include the resource 1571 of the activity included in the application. For example, the activity resource 1571 may include information about the image and layout included in the execution screen of the activity being changed, based on the configuration 1580.

The configuration 1580 may include information about the density (DPI) of the screen generated by the electronic device 40, the direction (portrait or landscape direction), the total size of the screen, and the execution screen size of the application. The configuration 1580 may correspond to each activity included in the application.

The display info 1590 may include information about the physical size (e.g., width and height) of the display.

Figure 16:
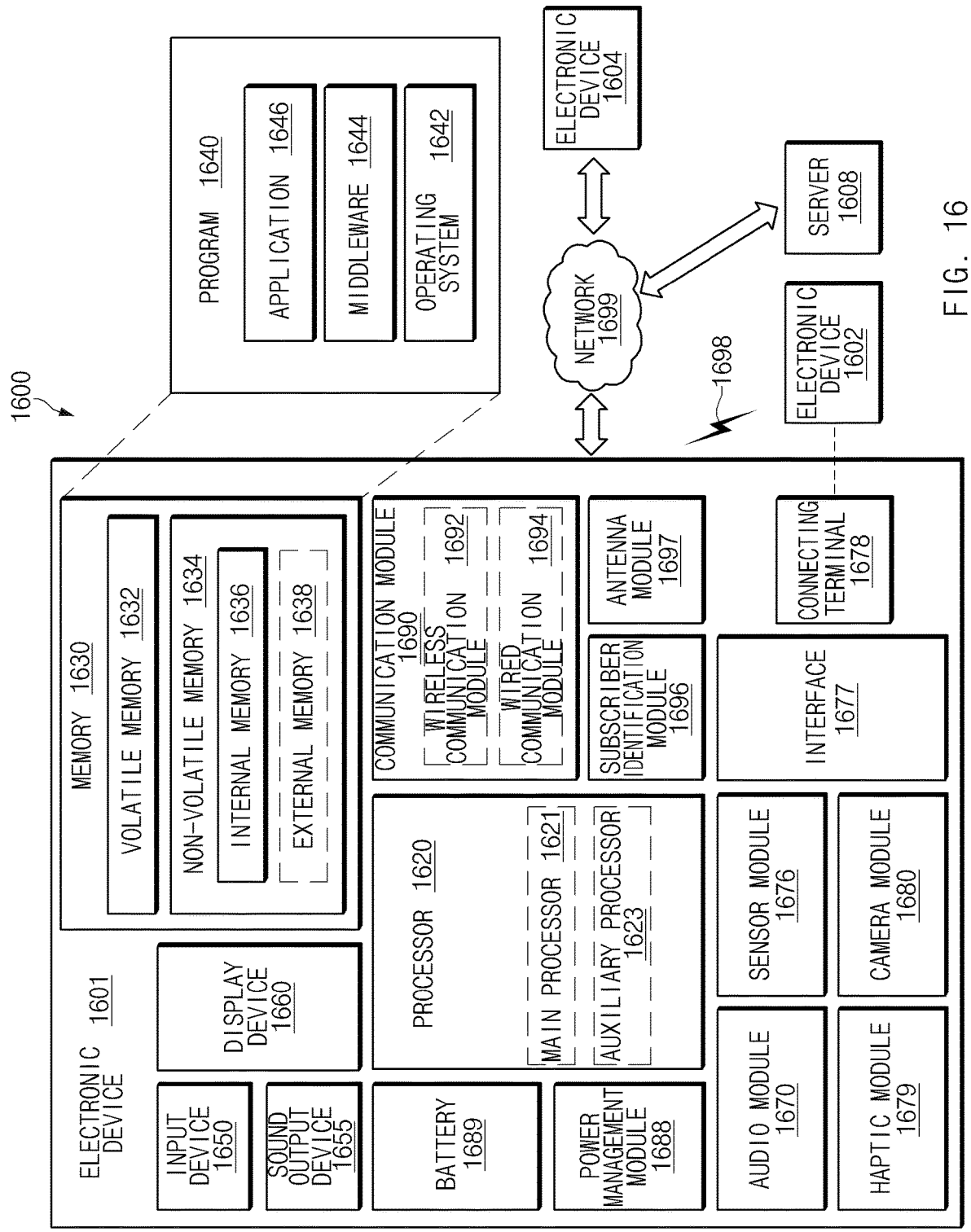
FIG. 16 illustrates a block diagram of an electronic device in a network environment, according to certain embodiments.

FIG. 16 is a block diagram of an electronic device 1601 (e.g., the electronic device 40 of FIG. 1) in a network environment 1600, according to certain embodiments. Referring to FIG. 1, the electronic device 1601 in the network environment 1600 may communicate with an electronic device 1602 (e.g., the external display device 10 of FIG. 1) over a first network 1698 (e.g., a short range wireless communication) or may communicate with an electronic device 1604 or a server 1608 over a second network 1699 (e.g., a long range wireless communication). The electronic device 1601 may communicate with the electronic device 1604 through the server 1608. According to an embodiment, the electronic device 1601 may include a processor 1620 (e.g., the processor 460 of FIG. 4), a memory 1630 (e.g., the memory 450 of FIG. 4), an input device 1650 (e.g., the input device 430 and the microphone 410 of FIG. 4), a sound output device 1655, a display device 1660 (e.g., the display 420 of FIG. 4), an audio module 1670, a sensor module 1676, an interface 1677, a haptic module 1679, a camera module 1680, a power management module 1688, a battery 1689, a communication module 1690 (e.g., the communication circuit 440 of FIG. 4), a subscriber identification module 1696, or an antenna module 1697. In any embodiment, the electronic device 1601 may not include at least one (e.g., the display device 1660 or the camera module 1680) of the above-described components or may further include one or more other components. In any embodiment, some of the components may be implemented as a single integrated circuit. For example, the sensor module 1676 (e.g., a fingerprint sensor, an iris sensor, or an illuminance sensor) may be implemented while being embedded in the display device 1660 (e.g., a display).

For example, the processor 1620 may execute software (e.g., a program 1640) to control at least another component (e.g., hardware or software component) of the electronic device 1601 connected to the processor 1620, and may process and calculate various types of data. According to an embodiment, as at least part of data processing or calculation, the processor 1620 may load commands or data received from other components (e.g., the sensor module 1676 or the communication module 1690) into a volatile memory 1632, may process commands or data stored in the volatile memory 1632, and may store the result data in a nonvolatile memory 1634. According to an embodiment, the processor 1620 may include a main processor 1621 (e.g., a central processing unit or an application processor) and an auxiliary processor 1623 (e.g., a graphic processing unit, an image signal processor, a sensor hub processor, or a communication processor) capable of operating independently or together with the main processor. Additionally or alternatively, the auxiliary processor 1623 may use lower power than main processor 1621 or may be configured to be specialized to a specified function. The auxiliary processor 1623 may be implemented separately from the main processor 1621 or as part of the main processor 1621.

For example, the auxiliary processor 1623 may control at least part of the functions or states associated with at least one (e.g., the display device 1660, the sensor module 1676, or the communication module 1690) of the components of the electronic device 1601, instead of the main processor 1621 while the main processor 1621 is in an inactive (e.g., sleep) state or together with the main processor 1621 while the main processor 1621 is in an active (e.g., the execution of an application) state. According to an embodiment, the auxiliary processor 1623 (e.g., an image signal processor or a communication processor) may be implemented as a part of operatively associated other components (e.g., the camera module 1680 or the communication module 1690).

The memory 1630 may store various pieces of data used by at least one component (e.g., the processor 1620 or the sensor module 1676) of the electronic device 1601. For example, data may include software (e.g., the program 1640) and input data or output data for commands associated with the software. The memory 1630 may include, for example, the volatile memory 1632 or the nonvolatile memory 1634.

The program 1640 may be stored as software in the memory 1630 and may include, for example, an operating system 1642, a middleware 1644, or an application 1646.

The input device 1650 may receive commands or data to be used for the component (e.g., the processor 1620) of electronic device 1601, from the outside (e.g., a user) of the electronic device 1601. The input device 1650 may include, for example, a microphone, a mouse, a keyboard, or a digital pen (e.g., a stylus pen).

The sound output device 1655 may output a sound signal to the outside of the electronic device 1601. The sound output device 1655 may include, for example, a speaker or a receiver. The speaker may be used for a general purpose, such as multimedia play or recording play, and the receiver may be used to receive an incoming call. According to an embodiment, the receiver may be implemented separately from the speaker or may be implemented as a part of the speaker.

The display device 1660 may visually provide information to the outside (e.g., the user) of the electronic device 1601. The display device 1660 may include, for example, a display, a hologram device, or a projector, and a control circuit for controlling a corresponding device. According to an embodiment, the display device 1660 may include a touch circuitry configured to sense a touch, or a sensor circuitry (e.g., a pressure sensor) configured to measure the strength of force generated by the touch.

The audio module 1670 may convert sound to an electrical signal, or reversely, may convert an electrical signal to sound. According to an embodiment, the audio module 1670 may obtain sound through the input device 1650, or may output sound through the sound output device 1655, or through an external electronic device (e.g., the electronic device 1602) (e.g., a speaker or a headphone) directly or wirelessly connected with the electronic device 1601.

The sensor module 1676 may sense an operation state (e.g., power or a temperature) of the electronic device 1601 or an external environment state (e.g., a user state), and may generate an electrical signal or a data value corresponding the sensed state. According to an embodiment, the sensor module 1676 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1677 may support one or more specified protocols that may be used to directly and wirelessly connect the electronic device 1601 with an external electronic device (e.g., the electronic device 1602). According to an embodiment, the interface 1677 may include, for example, a high definition multimedia interface (HDMI), a universal serial bus (USB) interface, a secure digital (SD) card interface, or an audio interface.

A connecting terminal 1678 may include a connector that may allow the electronic device 1601 to be physically connected with an external electronic device (e.g., the electronic device 1602). According to an embodiment, the connecting terminal 1678 may include, for example, a HDMI connector, a USB connector, a SD card connector, or an audio connector (e.g., a headphone connector).

The haptic module 1679 may convert an electrical signal to a mechanical stimulation (e.g., vibration or movement) or an electrical stimulation which the user may perceive through the sense of touch or the sense of movement. According to an embodiment, the haptic module 1679 may include, for example, a motor, a piezoelectric sensor, or an electrical stimulation device.

The camera module 1680 may photograph a still image and a video. According to an embodiment, the camera module 1680 may include one or more lenses, image sensors, image signal processors, or flashes (or electrical flashes).

The power management module 1688 may manage the power which is supplied to the electronic device 1601. According to an embodiment, the power management module 1688 may be implemented, for example, as at least a part of a power management integrated circuit (PMIC).

The battery 1689 may power at least one component of the electronic device 1601. According to an embodiment, the battery 1689 may include, for example, a primary cell not rechargeable, a secondary cell rechargeable, or a fuel cell.

The communication module 1690 may establish a direct (or wired) communication channel or a wireless communication channel between the electronic device 1601 and an external electronic device (e.g., the electronic device 1602, the electronic device 1604, or the server 1608) and may perform communication through the established communication channel. The communication module 1690 may include one or more communication processors which are operated independently of the processor 1620 (e.g., an application processor) and support direct (or wired) communication or wireless communication. According to an embodiment, the communication module 1690 may include a wireless communication module 1692 (e.g., a cellular communication module, a short range wireless communication module, or a global navigation satellite system (GNSS) communication module) or a wired communication module 1694 (e.g., a local area network (LAN) communication module or a power line communication module). A corresponding communication module of such communication modules may communicate with an external electronic device over the first network 1698 (e.g., a short range communication network such as BLUETOOTH™, WI-FI Direct™ ("Wi-Fi Direct"), or infrared data association (IrDA)) or the second network 1699 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 1692 may identify and authenticate the electronic device 1601 within a communication network, such as the first network 1698 or the second network 1699, by using subscriber information (e.g., international mobile subscriber identity (IMSI)) stored in the subscriber identification module 1696.

The antenna module 1697 may transmit a signal or a power to the outside (e.g., an external electronic device) or may receive a signal or a power from the outside. According to an embodiment, the antenna module may include one antenna including a radiator made of a conductor or a conductive pattern formed on a substrate (e.g., a PCB). According to an embodiment, the antenna module 1697 may include a plurality of antennas. In this case, at least one antenna suitable for a communication scheme used in a communication network such as the first network 1698 or the second network 1699 may be selected, for example, by the communication module 1690 from the plurality of antennas. The signal or power may be exchanged between the communication module 1690 and an external electronic device through the selected at least one antenna or may be received from the external electronic device through the selected at least one antenna and the communication module 1690. According to any embodiment, another component (e.g., RFIC) in addition to the radiator may be further formed as the part of the antenna module 1697.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 1601 and the external electronic device 1604 through the server 1608 connected to the second network 1699. Each of the electronic devices 1602 and 1604 may be a device of which the type is different from or the same as that of the electronic device 1601. According to an embodiment, all or a part of operations to be executed in the electronic device 1601 may be executed in one or more external devices of the external electronic devices 1602, 1604, or 1608. For example, in the case where the electronic device 1601 should perform any function or service automatically or in response to a request from the user or any other device, the electronic device 1601 may additionally request one or more external electronic devices to perform at least a part of the function or service, instead of internally executing the function or service. The one or more external electronic devices which receive the request may execute at least a part of the function or service thus requested or an additional function or service associated with the request, and may provide a result of the execution to the electronic device 1601. The electronic device 1601 may process the result as it is or additionally, and may provide the processed result as at least part of the response to the request. To this end, for example, a cloud computing, distributed computing, or client-server computing technology may be used.

Figure 17:
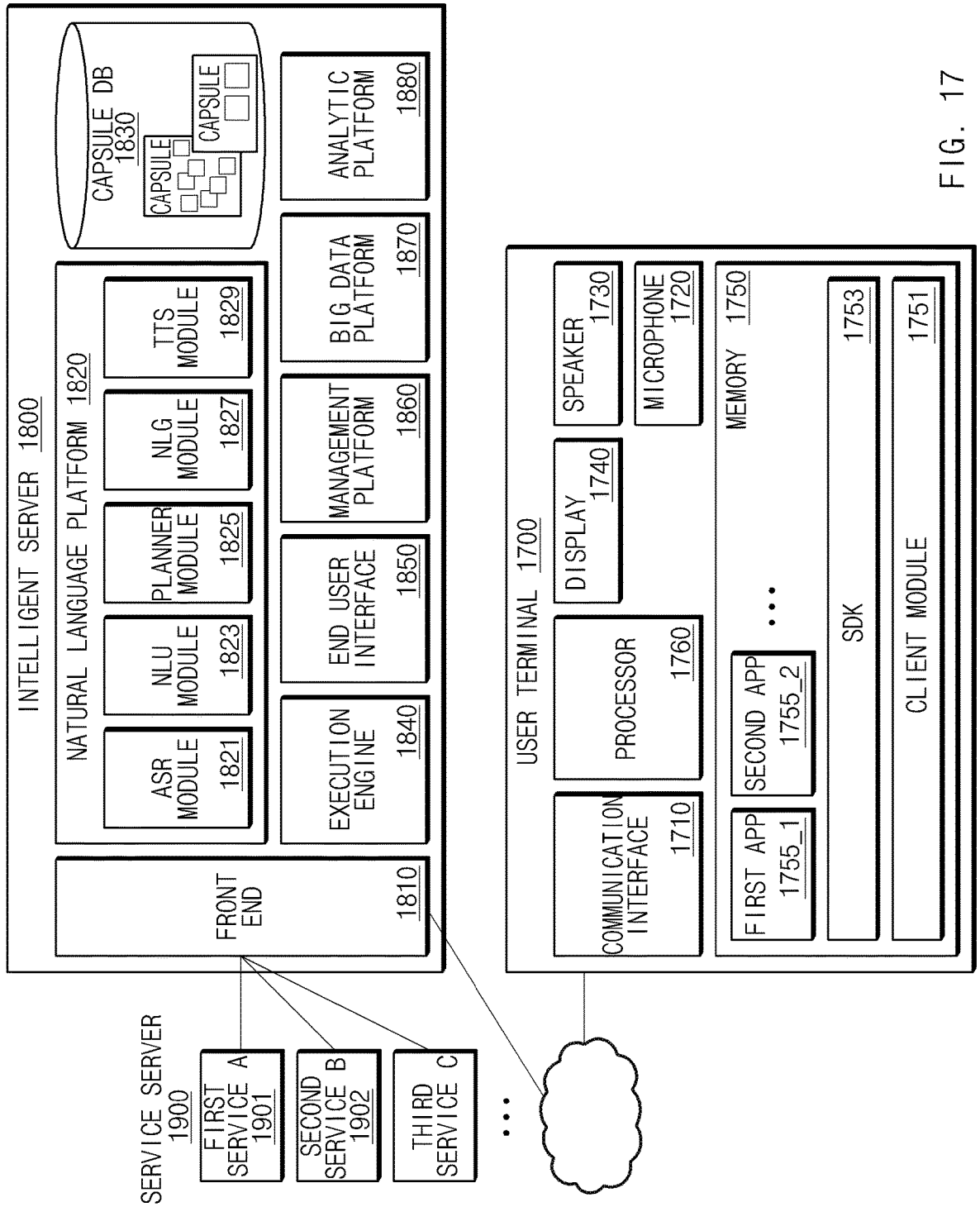
FIG. 17 is a block diagram illustrating an integrated intelligence system, according to an embodiment.

FIG. 17 is a block diagram illustrating an integrated intelligence system, according to an embodiment.

Referring to FIG. 17, an integrated intelligence system according to an embodiment may include a user terminal 1700, an intelligent server 1800, and a service server 1900.

The user terminal 1700 according to an embodiment may be a terminal device (or an electronic device) capable of connecting to Internet, and may be, for example, a mobile phone, a smartphone, a personal digital assistant (PDA), a notebook computer, TV, a white household appliance, a wearable device, a HMD, or a smart speaker.

According to the embodiment illustrated in FIG. 17, the user terminal 1700 may include a communication interface 1710, a microphone 1720, a speaker 1730, a display 1740, a memory 1750, or a processor 1760. The listed components may be operatively or electrically connected to one another.

The communication interface 1710 according to an embodiment may be configured to transmit or receive data to or from an external device. The microphone 1720 according to an embodiment may receive a sound (e.g., a user utterance) to convert the sound into an electrical signal. The speaker 1730 according to an embodiment may output the electrical signal as a sound (e.g., voice). The display 1740 according to an embodiment may be configured to display an image or a video. The display 1740 according to an embodiment may display the graphic user interface (GUI) of the running app (or an application program).

The memory 1750 according to an embodiment may store a client module 1751, a software development kit (SDK) 1753, and a plurality of apps 1755. The client module 1751 and the SDK 1753 may include a framework (or a solution program) for performing general-purposed functions. Furthermore, the client module 1751 or the SDK 1753 may include the framework for processing a voice input.

In the memory 1750 according to an embodiment, the plurality of apps 1755 may be a program for performing the specified function. According to an embodiment, the plurality of apps 1755 may include a first app 1755_1 and a second app 1755_2. According to an embodiment, each of the plurality of apps 1755 may include a plurality of actions for performing the specified function. For example, the apps may include an alarm app, a message app, and/or a schedule app. According to an embodiment, the plurality of apps 1755 may be executed by the processor 1760 to sequentially execute at least part of the plurality of actions.

According to an embodiment, the processor 1760 may control overall actions of the user terminal 1700. For example, the processor 1760 may be electrically connected to the communication interface 1710, the microphone 1720, the speaker 1730, and the display 1740 to perform a specified action.

Moreover, the processor 1760 according to an embodiment may execute the program stored in the memory 1750 to perform the specified function. For example, according to an embodiment, the processor 1760 may execute at least one of the client module 1751 or the SDK 1753 to perform the following actions for processing a voice input. The processor 1760 may control the actions of the plurality of apps 1755 via the SDK 1753. The following actions described as the actions of the client module 1751 or the SDK 1753 may be the action by the execution of the processor 1760.

According to an embodiment, the client module 1751 may receive a voice input. For example, the client module 1751 may receive a voice signal corresponding to a user utterance detected via the microphone 1720. The client module 1751 may transmit the received voice input to the intelligent server 1800. The client module 1751 may transmit the state information of the user terminal 1700 together with the received voice input, to the intelligent server 1800. For example, the state information may be the execution state information of an app.

According to an embodiment, the client module 1751 may receive the result corresponding to the received voice input. For example, when the intelligent server 1800 is capable of calculating the result corresponding to the received voice input, the client module 1751 may receive the result corresponding to the received voice input. The client module 1751 may display the received result in the display 1740.

According to an embodiment, the client module 1751 may receive the plan corresponding to the received voice input. The client module 1751 may display the result of executing a plurality of actions of an app in the display 1740 depending on the plan. For example, the client module 1751 may sequentially display the execution result of a plurality of actions in a display. For another example, the user terminal 1700 may display a part of results (e.g., the result of the last action) (i.e., as opposed to an entirety of the results) of executing a plurality of actions, in the display.

According to an embodiment, the client module 1751 may receive a request for obtaining information utilized to calculate the result corresponding to a voice input, from the intelligent server 1800. According to an embodiment, the client module 1751 may transmit the information to the intelligent server 1800 in response to the request.

According to an embodiment, the client module 1751 may transmit information about the result of executing a plurality of actions depending on the plan, to the intelligent server 1800. The intelligent server 1800 may determine that the received voice input is processed correctly, using the result information.

According to an embodiment, the client module 1751 may include a voice recognition module. According to an embodiment, the client module 1751 may recognize a voice input to perform the limited function, via the voice recognition module. For example, the client module 1751 may launch an intelligent app that processes a voice input for performing an organic action, via a specified input (e.g., wake up!).

According to an embodiment, the intelligent server 1800 may receive the information associated with a user's voice input from the user terminal 1700 over a communication network. According to an embodiment, the intelligent server 1800 may change the data associated with the received voice input to text data. According to an embodiment, the intelligent server 1800 may generate a plan for performing a task corresponding to a user voice input, based on the text data.

According to an embodiment, the plan may be generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the plan may be selected from a set of predefined plans or may be generated in real time in response to a user request. For example, the AI system may select at least one plan of the plurality of predefined plans.

According to an embodiment, the intelligent server 1800 may transmit the result according to the generated plan to the user terminal 1700 or may transmit the generated plan to the user terminal 1700. According to an embodiment, the user terminal 1700 may display the result according to the plan, on a display. According to an embodiment, the user terminal 1700 may display the result of executing the action according to the plan, on the display.

The intelligent server 1800 according to an embodiment may include a front end 1810, a natural language platform 1820, a capsule DB 1830, an execution engine 1840, an end user interface 1850, a management platform 1860, a big data platform 1870, or an analytic platform 1880.

According to an embodiment, the front end 1810 may receive a voice input received from the user terminal 1700. The front end 1810 may transmit a response corresponding to the voice input.

According to an embodiment, the natural language platform 1820 may include an automatic speech recognition (ASR) module 1821, a natural language understanding (NLU) module 1823, a planner module 1825, a natural language generator (NLG) module 1827, or a text to speech module (TTS) module 1829.

According to an embodiment, the ASR module 1821 may convert the voice input received from the user terminal 1700 to text data. According to an embodiment, the NLU module 1823 may grasp the intent of the user, using the text data of the voice input. For example, the NLU module 1823 may grasp the intent of the user by performing syntactic analysis or semantic analysis. According to an embodiment, the NLU module 1823 may grasp the meaning of words extracted from the voice input by using linguistic features (e.g., syntactic elements) such as morphemes or phrases and may determine the intent of the user by matching the grasped meaning of the words to the intent.

According to an embodiment, the planner module 1825 may generate the plan by using the intent and a parameter, which are determined by the NLU module 1823. According to an embodiment, the planner module 1825 may determine a plurality of domains utilized to perform a task, based on the determined intent. The planner module 1825 may determine a plurality of actions included in each of the plurality of domains determined based on the intent. According to an embodiment, the planner module 1825 may determine the parameter utilized to perform the determined plurality of actions or the result value output by the execution of the plurality of actions. The parameter and the result value may be defined as a concept of the specified form (or class). As such, the plan may include the plurality of actions and a plurality of concepts determined by the intent of the user. The planner module 1825 may determine the relationship between the plurality of actions and the plurality of concepts stepwise (or hierarchically). For example, the planner module 1825 may determine the execution sequence of the plurality of actions, which are determined based on a user's intent, based on the plurality of concepts. In other words, the planner module 1825 may determine the execution sequence of the plurality of actions, based on the parameters utilized to perform the plurality of actions and the result output by the execution of the plurality of actions. As such, the planner module 1825 may generate a plan including information (e.g., ontology) of the relationship between a plurality of actions and a plurality of concepts. The planner module 1825 may generate the plan, using the information stored in the capsule DB 1830 storing a set of relationships between concepts and actions.

According to an embodiment, the NLG module 1827 may change the specified information into information in the text form. The information changed to the text form may be a form of a natural language utterance. The TTS module 1829 according to an embodiment may change information of the text form to information of a voice form.

According to an embodiment, all or part of the functions of the natural language platform 1820 may be also implemented in the user terminal 1700.

The capsule DB 1830 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 1830 may store the plurality of capsules in the form of a concept action network (CAN). According to an embodiment, the plurality of capsules may be stored in the function registry included in the capsule DB 1830.

The capsule DB 1830 may include a strategy registry that stores strategy information utilized to determine a plan corresponding to a voice input. The strategy information may include reference information for determining a single plan when there are a plurality of plans corresponding to the voice input. According to an embodiment, the capsule DB 1830 may include a follow up registry that stores the information of the follow-up action for suggesting a follow-up action to the user in the specified context. For example, the follow-up action may include a follow-up utterance. According to an embodiment, the capsule DB 1830 may include a layout registry for storing layout information of the information output via the user terminal 1700. According to an embodiment, the capsule DB 1830 may include a vocabulary registry that stores vocabulary information included in the capsule information. According to an embodiment, the capsule DB 1830 may include a dialog registry that stores information about dialog (or interaction) with the user. The capsule DB 1830 may update the object stored via a developer tool. For example, the developer tool may include a function editor for updating an action object or a concept object. The developer tool may include a vocabulary editor for updating the vocabulary. The developer tool may include a strategy editor that generates and registers a strategy for determining the plan. The developer tool may include a dialog editor that creates a dialog with the user. The developer tool may include a follow up editor capable of activating the follow-up target and editing the follow-up utterance for providing a notification. The follow-up target may be determined based on the currently set target, the preference of the user, or environment condition. The capsule DB 1830 according to an embodiment may be also implemented in the user terminal 1700.

According to an embodiment, the execution engine 1840 may calculate the result, using the generated plan. The end user interface 1850 may transmit the calculated result to the user terminal 1700. As such, the user terminal 1700 may receive the result and may provide the user with the received result. According to an embodiment, the management platform 1860 may manage information used by the intelligent server 1800. According to an embodiment, the big data platform 1870 may collect data of the user. According to an embodiment, the analytic platform 1880 may manage the quality of service (QoS) of the intelligent server 1800. For example, the analytic platform 1880 may manage the component and processing speed (or efficiency) of the intelligent server 1800.

According to an embodiment, the service server 1900 may provide the user terminal 1700 with a specified service (e.g., food order or hotel reservation). According to an embodiment, the service server 1900 may be a server operated by the third party. According to an embodiment, the service server 1900 may provide the intelligent server 1800 with information for generating a plan corresponding to the received voice input. The provided information may be stored in the capsule DB 1830. Furthermore, the service server 1900 may provide the intelligent server 1800 with result information according to the plan. The service server 1900 may include a first service A 1901, second service B 1902, and third service C to a nth service.

In the above-described integrated intelligence system, the user terminal 1700 may provide the user with various intelligent services in response to a user input. The user input may include, for example, an input through a physical button, a touch input, or a voice input.

According to an embodiment, the user terminal 1700 may provide a speech recognition service via an intelligent app (or a speech recognition app) stored therein. In this case, for example, the user terminal 1700 may recognize the user utterance or the voice input received via the microphone and may provide the user with a service corresponding to the recognized voice input.

According to an embodiment, the user terminal 1700 may perform a specified action, based on the received voice input, independently, or together with the intelligent server and/or the service server. For example, the user terminal 1700 may execute an app corresponding to the received voice input and may perform the specified action via the executed app.

According to an embodiment, when the user terminal 1700 provides a service together with the intelligent server 1800 and/or the service server, the user terminal may detect a user utterance, using the microphone 1720 and may generate a signal (or voice data) corresponding to the detected user utterance. The user terminal may transmit the voice data to the intelligent server 1800, using the communication interface 1710.

According to an embodiment, the intelligent server 1800 may generate a plan for performing a task corresponding to the voice input or the result of performing an action depending on the plan, as the response to the voice input received from the user terminal 1700. For example, the plan may include a plurality of actions for performing the task corresponding to the voice input of the user and a plurality of concepts associated with the plurality of actions. The concept may define a parameter to be input for the execution of the plurality of actions or a result value output by the execution of the plurality of actions. The plan may include relationship information between a plurality of actions and a plurality of concepts.

According to an embodiment, the user terminal 1700 may receive the response, using the communication interface 1710. The user terminal 1700 may output the voice signal generated in user terminal 1700, to the outside using the speaker 1730 or may output an image generated in the user terminal 1700, to the outside using the display 1740.

Figure 18:
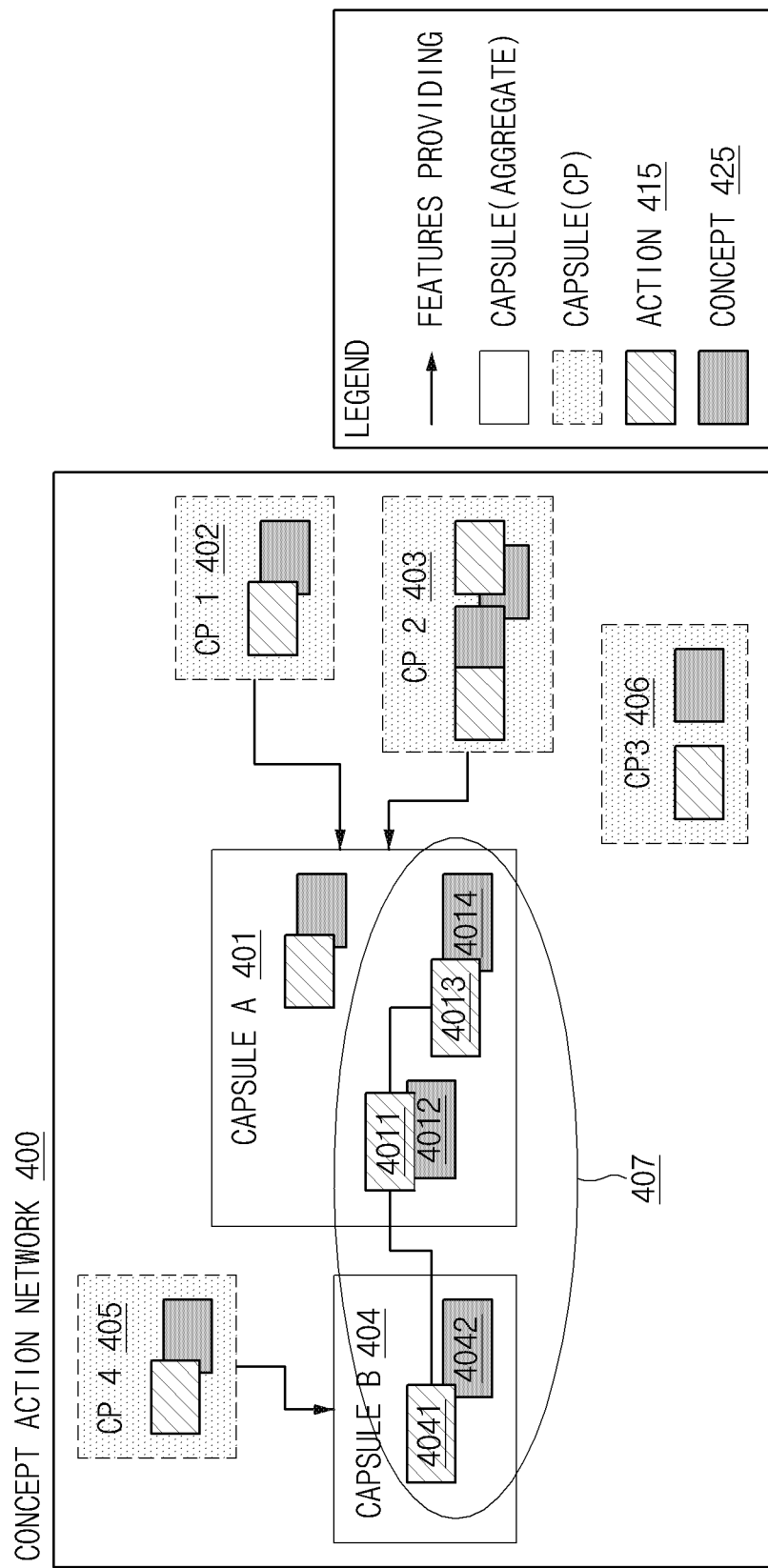
FIG. 18 is a diagram illustrating the form in which relationship information between a concept and an action is stored in a database, according to an embodiment.

FIG. 18 is a diagram illustrating the form in which relationship information between a concept and an action is stored in a database, according to certain embodiments.

The capsule database (e.g., the capsule DB 1830) of the intelligent server 1800 may store a capsule in the form of a concept action network (CAN) 400. The capsule database may store an action for processing a task corresponding to a voice input and a parameter utilized for the action, in the CAN form.

The capsule database may store a plurality capsules capsule (A) 401 and capsule (B) 404 respectively corresponding to a plurality of domains (e.g., applications). According to an embodiment, a single capsule (e.g., the capsule (A) 401) may correspond to one domain (e.g., a location, geographic location, geo or an application). Furthermore, at least one service provider (e.g., CP 1 402, CP 2 403, and CP3 406 for performing the function for the domain associated with the capsule may correspond to the single capsule. According to an embodiment, the single capsule may include at least one or more actions 415 and at least one or more concepts 425 for performing a specified function.

The natural language platform 1820 may generate a plan for performing a task corresponding to the received voice input, using the capsule stored in the capsule database. For example, the planner module 1825 of the natural language platform may generate a plan, using the capsule stored in the capsule database. For example, the planner module 1825 may generate a plan 407, using actions 4011 and 4013 and concepts 4012 and 4014 of the capsule A 410 and an action 4041 and a concept 4042 of the capsule B 404.

Figure 19:
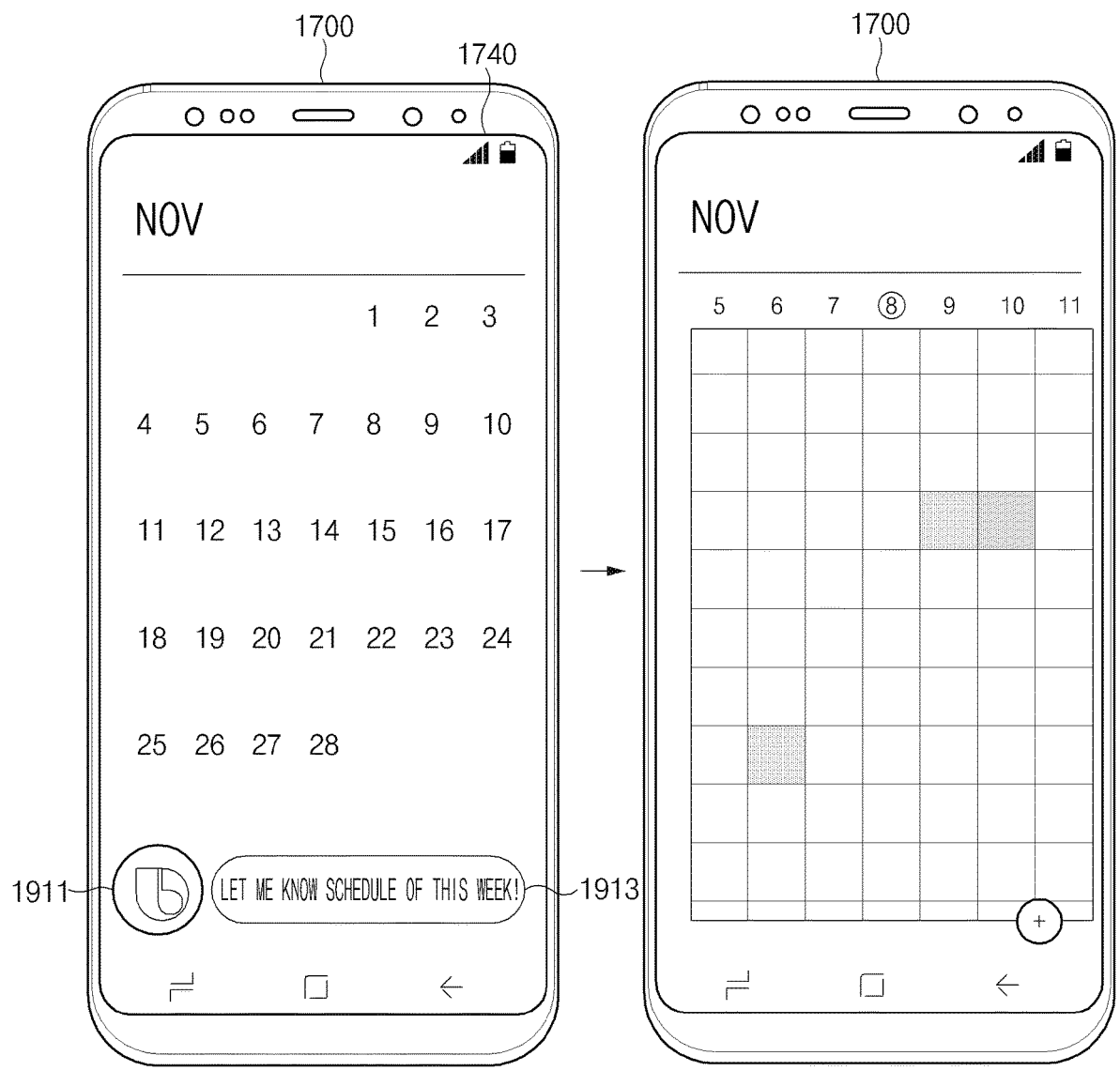
FIG. 19 is a view illustrating a user terminal displaying a screen of processing a voice input received through an intelligent app, according to an embodiment.

FIG. 19 is a view illustrating a screen in which a user terminal processes a voice input received through an intelligent app, according to certain embodiments.

The user terminal 1700 may execute an intelligent app to process a user input through the intelligent server 1800.

According to an embodiment, in screen 310, when recognizing a specified voice input (e.g., wake up!) or receiving an input via a hardware key (e.g., the dedicated hardware key), the user terminal 1700 may launch an intelligent app for processing a voice input. For example, the user terminal 1700 may launch an intelligent app in a state in which a schedule app is being executed. According to an embodiment, the user terminal 1700 may display an object (e.g., an icon) 1911 corresponding to the intelligent app, in the display 1740. According to an embodiment, the user terminal 1700 may receive a voice input by a user utterance. For example, the user terminal 1700 may receive a voice input saying that "let me know the schedule of this week!". According to an embodiment, the user terminal 1700 may display a user interface (UI) 1913 (e.g., an input window) of an intelligent app, in which text data of the received voice input is displayed, in a display According to an embodiment, in screen 320, the user terminal 1700 may display the result corresponding to the received voice input, in the display. For example, the user terminal 1700 may receive the plan corresponding to the received user input and may display 'the schedule of this week' in the display depending on the plan.

The electronic device according to certain embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

Certain embodiments of the disclosure and terms used herein are not intended to limit the technical features described in the disclosure to specific embodiments, and it should be understood that the embodiments and the terms include modification, equivalent, or alternative on the corresponding embodiments described herein. With regard to description of drawings, similar or related components may be marked by similar reference marks/numerals. The singular form of the noun corresponding to an item may include one or more of items, unless interpreted otherwise in context. In the disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first" or "second" may be used to simply distinguish the corresponding component from the other component, but do not limit the corresponding components in other aspects (e.g., importance or order). When a component (e.g., a first component) is referred to as being "coupled with/to" or "connected to" another component (e.g., a second component) with or without the term of "operatively" or "communicatively", it may mean that a component is connectable to the other component, directly (e.g., by wire), wirelessly, or through the third component.

The term "module" used herein may include a unit, which is implemented with hardware, software, or firmware, and may be interchangeably used with the terms "logic", "logical block", "part", "circuit", or the like. The "module" may be a minimum unit of an integrated part or may be a minimum unit of the part for performing one or more functions or a part thereof. For example, according to an embodiment, the module may be implemented in the form of an application-specific integrated circuit (ASIC).

Certain embodiments of the disclosure may be implemented with software (e.g., program 1640) including one or more instructions stored in a storage medium (e.g., the embedded memory 1636 or the external memory 1638) readable by a machine (e.g., the electronic device 1601). For example, the processor (e.g., the processor 1620) of the machine (e.g., the electronic device 1601) may call at least one instruction of the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' indicates that the storage medium is a tangible device and does not include a signal (e.g., electromagnetic waves), and this term does not distinguish between the case where data is semi-permanently stored in the storage medium and the case where the data is stored temporarily.

According to an embodiment, a method according to certain embodiments disclosed herein may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product may be at least temporarily stored in the machine-readable storage medium such as the memory of a manufacturer's server, an application store's server, or a relay server or may be generated temporarily.

According to certain embodiments, each component (e.g., a module or a program) of the above-described components may include a single entity or a plurality of entities. According to certain embodiments, one or more the components of the above-described components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to certain embodiments, operations executed by modules, program, or other components may be executed by a successive method, a parallel method, a repeated method, or a heuristic method, or one or more of the operations may be executed in different sequences or omitted. Alternatively, one or more other operations may be added. It will be understood by those skilled in the art that various changes in form and details may be made therein without departing from the disclosure as defined by the appended claims and their equivalents.

According to embodiments disclosed in the disclosure, it is possible to generate a short cut icon, which allows at least one task (each task includes a plurality of actions) mapped to a voice input to be performed based on a user's manipulation (e.g., touch). Besides, a variety of effects directly or indirectly understood through the disclosure may be provided.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device comprising:
a display;
a microphone;
a communication circuit;
a processor operatively connected to the display, the microphone, and the communication circuit; and
a memory operatively connected to the processor,
wherein the memory stores instructions that, when executed, cause the processor to:
access a database in which words, phrases and/or sentences are mapped to a plurality of tasks;

receive a first user utterance through the microphone when the electronic device is not communicatively coupled to an external display device;

responsive to receiving the first user utterance, execute a task corresponding to at least one of a word, phrase or sentence included in the first user utterance as indicated by the mapping of the database, wherein the task is preconfigured by a user;

display an editing menu including a first dialog button for selectively enabling display of a mobile shortcut to execute the task to the display, and a second dialog button for selectively enabling display of a desktop shortcut to execute the task to the external display device;

detect selection of at least the second dialog button;

detect connection of the electronic device to the external display;

in response to detecting connection of the electronic device to the external display, display the desktop shortcut to the external display based on selection of the second dialog button, as part of a graphic user interface (GUI) generated by the electronic device for display to the external display; and in response to detecting selection of the desktop shortcut from the GUI, execute the task in absence of receiving the first user utterance by the microphone.

2. The electronic device of claim 1, wherein the preconfigured task includes a plurality of processes; and wherein the instructions are further executed to:

responsive to detecting selection of one of the mobile shortcut displayed on the display and the desktop shortcut displayed on the external display device, selectively execute the task in absence of detecting the first user utterance by the microphone depending on whether a lock function is set for the one of the mobile shortcut and the desktop shortcut.

3. The electronic device of claim 2, wherein the plurality of processes are executed using a plurality of applications, and wherein the instructions are further executed by the processor to cause the electronic device to:
detect selection of the first dialog button;
terminate display of the editing menu; and
in response to terminating the display of the editing menu, display the mobile shortcut based on the detected selection of the first dialog button.

4. The electronic device of claim 1, wherein the communication circuit includes at least one of a universal serial bus (USB), high-definition multimedia interface (HDMI), d-subminiature (D-SUB), and an optical interface.

5. The electronic device of claim 1, wherein the instructions are further executed to cause the processor to:

receiving a second user utterance including at least one second word, second phrase, or second sentence from another electronic device;

execute a second task corresponding to at least one of the second word, the second phrase or the second sentence included in the second user utterance as indicated by the mapping of the database, wherein the second task is preconfigured by a user; and after receiving the second user utterance, when the electronic device is communicatively coupled to the external display device, display, on the external display device, at least one of a second text and a second GUI indicating the at least one of the second word, the second phrase or the second sentence included in the second user utterance and corresponding with the executed second task.

6. The electronic device of claim 1, wherein the GUI is displayed in at least one of a web browser, a user interface of an application program, a quick toolbar, and a home screen.

7. The electronic device of claim 1, wherein the instructions are further executed to cause the processor to:
after receiving the first user utterance, when the electronic device is not communicatively coupled to the external display device, display the GUI on the display.

8. The electronic device of claim 1, wherein the instructions are further executed to cause the processor to:
after receiving the first user utterance, when the electronic device is communicatively coupled to the external display device, change a configuration of the preconfigured task, based on inputs detected to the GUI.

9. The electronic device of claim 8, wherein the preconfigured task includes a plurality of processes, and
wherein changing a configuration of the preconfigured task includes at least one of changing an execution order for the plurality of processes, and deleting at least one of the plurality of processes.

10. The electronic device of claim 1, wherein the instructions are further executed to cause the processor to:
after receiving the first user utterance, when the electronic device is communicatively coupled to the external display device, change the at least one of the word, phrase and sentence, based an input editing the GUI.

11. The electronic device of claim 1, wherein the instructions are further executed to cause the processor to:
when receiving an execution request to the GUI, identify an application corresponding to the preconfigured task; and
selectively output an execution screen of the identified application on the external display device or the display, based on whether the identified application is included on a prespecified list.

12. The electronic device of claim 1, wherein the instructions are further executed to cause the processor to:
output a notification prompting generation of at least the GUI, based on at least one of user preference, time, a location of the electronic device, and a device setting state of the electronic device.

13. The electronic device of claim 1, wherein, when the at least one of the word, phrase, or sentence is a prestored as a quick command, and when the GUI includes a short cut menu or icon corresponding to the quick command,
the instructions are further executed to cause the processor to:
when the quick command includes a plurality of quick commands, sort a plurality of short cut menus or icons corresponding to the quick commands, based on respective usage frequencies of each of the plurality of quick commands, and
display the sorted plurality of short cut menus or icons on the external display device.

14. A method in an electronic device, the method comprising:
accessing a database in which words, phrases and/or sentences are mapped to a plurality of tasks;
determining whether the electronic device is communicatively coupled to an external display device;
when the electronic device is not communicatively coupled to the external display device, receiving a first user utterance through a microphone;

responsive to receiving the first user utterance, executing a task corresponding to at least one of a word, phrase or sentence included in the first user utterance as indicated by the mapping in the database, wherein the task is preconfigured by a user;

displaying an editing menu including a first dialog button for selectively enabling display of a mobile shortcut to execute the task to a local display device, and a second dialog button for selectively enabling display of a desktop shortcut to execute the task to the external display device;

detecting selection of at least the second dialog button;

detecting connection of the electronic device to the external display;

in response to detecting connection of the electronic device to the external display, displaying the desktop shortcut to the external display based on selection of the second dialog button, as part of a graphic user interface (GUI) generated by the electronic device for display to the external display; and in response to detecting selection of the desktop shortcut from the GUI, executing the task in absence of receiving the first user utterance by the microphone.

15. The method of claim 14, further comprising:
receiving an input editing the GUI; and
changing a configuration of the preconfigured task based on the input editing the GUI.

16. The method of claim 14, further comprising:
receiving an input editing the GUI; and
changing one of the at least one of the word, phrase, and sentence, based on the received input.

17. The method of claim 14, further comprising:
when receiving an execution request to the GUI, identifying an application corresponding to the preconfigured task; and
selectively outputting an execution screen of the identified application on the external display device or the local display device, based on whether the identified application is included on a prespecified list.

18. The method of claim 14, further comprising:
outputting a notification prompting generation of the GUI, based on at least one of user preference, time, a location of the electronic device, and a device setting state of the electronic device.

19. The method of claim 14, wherein, when the at least one of the word, phrase, or sentence is a prestored as a quick command, and when the the GUI includes a short cut menu or icon corresponding to the quick command, the method further comprising:

when the quick command includes a plurality of quick commands, sort a plurality of short cut menus or icons corresponding to the quick commands, based on respective usage frequencies of each of the plurality of quick commands, and display the sorted plurality of short cut menus or icons on the external display device.

20. An electronic device comprising:
a display;
a microphone;
a processor operatively connected to the display and the microphone; and
a memory operatively connected to the processor,
wherein the memory stores instructions that, when executed, cause the processor to:
access a database in which words, phrases and/or sentences are mapped to a plurality of tasks;
receive a first user utterance through the microphone;
responsive to receiving the first user utterance, execute a task corresponding to at least one of a word, phrase or sentence included in the first user utterance as indicated by the mapping of the database, wherein the task is preconfigured by a user;
displaying an editing menu,
including a first dialog button for selectively enabling display of a mobile shortcut to execute the task to a local display device, and a second dialog button for selectively enabling display of a desktop shortcut to execute the task to an external display device, wherein the mobile and desktop shortcuts are selectable to cause execution of the task;
detect selection of at least the second dialog button;
detect connection of the electronic device to the external display;
in response to detecting connection of the electronic device to the external display, displaying the desktop shortcut to the external display based on selection of the second dialog button, as part of a graphic user interface (GUI) generated by the electronic device for display to the external display; and
in response to detecting selection of the desktop shortcut, executing the task in absence of receiving the first user utterance by the microphone.

* * * * *